(12) United States Patent
Awano

(10) Patent No.: US 9,900,249 B2
(45) Date of Patent: *Feb. 20, 2018

(54) COMMUNICATION SYSTEM, FORWARDING NODE, PATH MANAGEMENT SERVER, COMMUNICATION METHOD, AND PROGRAM

(71) Applicant: NEC CORPORATION, Tokyo (JP)

(72) Inventor: Jun Awano, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/244,701

(22) Filed: Apr. 3, 2014

(65) Prior Publication Data

US 2014/0219281 A1    Aug. 7, 2014

Related U.S. Application Data

(63) Continuation of application No. 13/176,610, filed on Jul. 5, 2011, now Pat. No. 8,750,163, which is a
(Continued)

(30) Foreign Application Priority Data

Sep. 14, 2009    (JP) .................................. 2009-212221

(51) Int. Cl.
*H04L 12/741* (2013.01)
*H04L 12/721* (2013.01)
*H04L 12/717* (2013.01)

(52) U.S. Cl.
CPC ............ *H04L 45/745* (2013.01); *H04L 45/34* (2013.01); *H04L 45/42* (2013.01)

(58) Field of Classification Search
CPC ......... H04L 45/04; H04L 45/24; H04L 45/66; H04L 45/00; H04L 45/302; H04L 45/50; H04L 49/351
(Continued)

(56) References Cited

U.S. PATENT DOCUMENTS 6,788,689 B1    9/2004 Turner et al.
7,447,151 B2 *  11/2008 McDysan ............... H04L 12/24
                                                        370/231
(Continued)

FOREIGN PATENT DOCUMENTS

CN    1988498 A     6/2007
CN   101047614 A   10/2007
(Continued)

OTHER PUBLICATIONS

Japanese Office Action dated Apr. 21, 2015 with partial English Translation.
(Continued)

*Primary Examiner* — Sai Aung
(74) *Attorney, Agent, or Firm* — McGinn IP Law Group, PLLC

(57) ABSTRACT

A packet forwarding node includes a storage unit to store a packet forwarding table used for forwarding a packet based on an identifier which identifies a link between nodes on a packet forwarding path and a forwarding unit to receive an incoming packet including a plurality of the identifiers, and to forward the incoming packet based on an identifier corresponding to the packet forwarding node.

27 Claims, 20 Drawing Sheets

Related U.S. Application Data continuation of application No. PCT/JP2010/065712, filed on Sep. 13, 2010.

(58) Field of Classification Search
USPC .......... 370/401, 392, 231, 252, 352, 395.53
See application file for complete search history.

(56) References Cited

U.S. PATENT DOCUMENTS

| | | | |
|---|---|---|---|
| 7,471,669 | B1 | 12/2008 | Sabesan et al. |
| 7,496,096 | B1* | 2/2009 | Dong .................. H04L 45/00 370/392 |
| 7,522,603 | B2* | 4/2009 | Vasseur ................ H04L 12/66 370/238.1 |
| 7,706,344 | B2 | 4/2010 | Kobayashi et al. |
| 8,125,928 | B2* | 2/2012 | Mehta ................ H04L 12/4625 370/254 |
| 8,559,434 | B2 | 10/2013 | Esteve Rothenberg et al. |
| 2002/0071389 | A1* | 6/2002 | Seo ..................... H04L 45/00 370/232 |
| 2002/0150041 | A1 | 10/2002 | Reinshmidt et al. |
| 2002/0176363 | A1* | 11/2002 | Durinovic-Johri ..... H04L 45/00 370/237 |
| 2002/0176370 | A1* | 11/2002 | Ohba .................. H04L 49/309 370/252 |
| 2003/0053427 | A1* | 3/2003 | Kanda .................. H04W 8/14 370/328 |
| 2007/0280102 | A1* | 12/2007 | Vasseur ................ H04J 3/14 370/225 |
| 2008/0123651 | A1* | 5/2008 | Vasseur .............. H04L 12/4633 370/392 |
| 2008/0137615 | A1* | 6/2008 | Park .................. H04L 45/302 370/332 |
| 2008/0279196 | A1* | 11/2008 | Friskney ............ H04L 12/4645 370/395.53 |
| 2009/0046732 | A1 | 2/2009 | Pratt, Jr. et al. |
| 2010/0165995 | A1* | 7/2010 | Mehta .................. H04L 12/462 370/400 |
| 2011/0149973 | A1* | 6/2011 | Esteve Rothenberg ............ H04L 45/00 370/392 |

FOREIGN PATENT DOCUMENTS

| | | |
|---|---|---|
| CN | 101505278 A | 8/2009 |
| EP | 1 320 224 A1 | 6/2003 |
| JP | 2002-198989 A | 7/2002 |
| JP | 2004-80637 A | 3/2004 |
| JP | 7-336383 A | 12/2004 |
| JP | 2004-356883 A | 12/2004 |
| JP | 2007-235444 A | 9/2007 |
| JP | 2012-501127 A | 1/2012 |

OTHER PUBLICATIONS

Notice of Allowance for U.S. Appl. No. 13/176,610 dated Feb. 1, 2014.

Final Office Action for U.S. Appl. No. 13/176,610 dated Oct. 9, 2013.

Non-Final Office Action for U.S. Appl. No. 13/176,610 dated Mar. 7, 2013.

Petri Jokela et al, "LIPSIN: Line Speed Publish/Subscribe Inter-Networking", SIGCOMM' 09, Aug. 21, 2009, Barcelona, Spain, pp. 195-206.

Nick McKeown, et al., 'Open Flow: Enabling Innovation in Campus Networks', [online], [search conducted Jul. 17, 2009] Internet URL: http://www.OpenFlowSwitch.org//documents/OpenFlow-wp-latest.pdf; Mar. 14, 2008.

Extended European Search Report dated Aug. 10, 2016.

Jokela Petri, et al.: Lipsin: "Line Speed Publish/Subscribe Inter-Networking. TR09-0001, version 1.0" PSIRP, Publish-Subscribe Internet Routing Paradigm (Jan. 9, 2009) pp. 1-39, XP002566408, Retrieved from the Internet: URL:http://www.psirp.org/filesjDeliverables/PSIRP-TR09-0001_LIPSIN.pdf [retrieved on Feb. 2, 2010].

United States Office Action dated Jan. 12, 2016 in co-pending U.S. Appl. No. 13/137,237.

United States Office Action dated Jul. 27, 2016 in co-pending U.S. Appl. No. 13/137,237.

* cited by examiner

FIG. 3

| LOCAL_ID | INTERFACE | NEXT HOP |
|---|---|---|
| Link ID_1 | IF_1 | Node_1 |
| Link ID_2 | IF_2 | Node_2 |
| Link ID_3 | IF_3 | Node_3 |
| .. | | |

FIG. 18A

PATH INFORMATION CACHE OF BOUNDARY FORWARDING NODE 301a

| TIME OF CREATION | SOURCE ADDRESS | DESTINATION ADDRESS | PATH INFORMATION |
|---|---|---|---|
| HH:MM:SS | 192.168.0.50 | 192.168.0.20 | Direction (1), CurrentOffset (0), RouteLength (3), LocalIDs (1, 2, 0) |
| ⋮ | ⋮ | ⋮ | ⋮ |

FIG. 18B

PATH INFORMATION CACHE OF BOUNDARY FORWARDING NODE 301b

| TIME OF CREATION | SOURCE ADDRESS | DESTINATION ADDRESS | PATH INFORMATION |
|---|---|---|---|
| HH:MM:SS | 192.168.0.50 | 192.168.0.20 | Direction (1), CurrentOffset (2), RouteLength (3), LocalIDs (1, 2, 0) |
| ⋮ | ⋮ | ⋮ | ⋮ |

COMMUNICATION SYSTEM, FORWARDING NODE, PATH MANAGEMENT SERVER, COMMUNICATION METHOD, AND PROGRAM

CROSS REFERENCES TO RELATED APPLICATIONS

This application is a Continuation Application of U.S. patent application Ser. No. 13/176,610, filed on Jul. 5, 2011, which in turn is a Continuation Application of International Patent Application No. PCT/JP2010/065712, filed on Sep. 13, 2010, and claims priority to Japanese Patent Application No. 2009-212221, filed on Sep. 14, 2009, all of which are incorporated herein by reference in their entireties.

TECHNICAL FIELD

The present invention relates to a communication system, a forwarding node, a path management server, a communication method, and a computer program, and in particular relates to a communication system, a forwarding node, a path management server, a communication method, and a computer program, which implement communication by forwarding a packet by a forwarding node arranged in a network.

BACKGROUND

FIG. 20 shows a network configuration using IP (Internet Protocol). In FIG. 20, communication nodes 100 (communication node 100a and communication node 100b) are communication nodes that perform communication using IP. When a forwarding node 200 receives an IP packet transmitted by a communication node 100, it determines a forwarding destination of the IP packet and forwards to the determined forwarding destination. Forwarding nodes repeat this, and ultimately forward the IP packet to a communication node that is the destination.

In determining the forwarding destination of the IP packet, the forwarding node 200 uses a routing table held internally. The routing table is a table indicating which network destination packet should be transmitted, though which interface, to a forwarding node that takes on the next forwarding processing; and a corresponding destination network address, next forwarding destination IP address, and destination interface are listed in the table as one entry. The entry includes information outside of the abovementioned information, but here this is omitted for simplicity.

The network address is an address obtained by extracting a number of upper bits of an IP address, and is expressed in a format such as 192.168.1.0/24. In this case, the upper 24 bits of the address are the network address, and addresses from 192.168.1.1 to 192.168.1.255 are included in the network in question. On this occasion, 24 is called a prefix length.

When appropriate route information is determined from the routing table, the forwarding node 200 uses a method known as a longest match method. This is a method in which a destination address of the IP packet and respective entries of the routing table are compared, to determine an entry where there is a match of a longer number of bits from an upper bit of the destination address.

The routing table is set in advance by a method such as a manual setting in the forwarding nodes 200, or automatically by a protocol for exchanging route information called a routing protocol.

In an IP network, packets are forwarded by the above forwarding method, but there is a problem in that, in this case, packet forwarding depends on the routing table of the respective forwarding nodes, and paths cannot be completely controlled. Furthermore, since the forwarding destination is determined by only the destination address, there is a problem in that exact path control is not possible due to differences concerning which application the communication is performed by, or of source address.

As a way of performing the above-mentioned path control, there is a method known as source routing. Source routing is a method in which a node that is a source (for example, communication node 100a) explicitly lists up, in a packet to be transmitted, addresses of forwarding nodes 200 that are desired to be in a forwarding path. In this case, the communication node 100a can forward a packet to a node (for example, communication node 100b) that is a destination by a forwarding path intended by an application or the like that is being used.

Furthermore, in packet forwarding technology known as MPLS (Multi-Protocol Label Switching) also, technology exists that corresponds to source routing. MPLS is a technology in which a label is assigned to a received packet, and forwarding processing is performed based on the label.

Assigning the label is performed when, after the packet is received by a forwarding node arranged at a boundary of an MPLS network, the packet is forwarded, and forwarding nodes inside the MPLS network thereafter repeat forwarding processing while re-attaching the label each time the packet is forwarded. When forwarding to an external network by a forwarding node arranged at the boundary of the MPLS network, the label is removed by the forwarding node in question.

In the MPLS, technology corresponding to the source routing is CR-LDP (Constraint Routing-Label Distribution Protocol). LDP is a protocol for exchanging the label among forwarding nodes in the MPLS network, and with an object of traffic engineering or the like, LDP, which has an object of strictly indicating a packet forwarding path, is CR-LDP.

Patent Document 1 discloses a method where, in an ad hoc network, the total amount of control packets can be reduced, not by having all mobile terminal devices transmit link information between neighboring mobile terminal devices, but by only a mobile terminal device, which is a cluster head, transmitting the link information.

Furthermore, similarly with regard to performing path control, Non-Patent Document 1 proposes a technology known as OpenFlow. In OpenFlow, communication is taken as end-to-end flow, and path control, recovery from failure, load balancing, and optimization are performed in flow units. An OpenFlow switch functioning as a forwarding node is provided with a secure channel for communication with an OpenFlow controller, and operates according to a flow table in which appropriate addition or rewriting is indicated by an OpenFlow controller. In the flow table are definitions of sets of rules for collation with packet headers, actions defining processing content, and flow statistical information.

For example, when an OpenFlow switch receives a first packet, an entry is searched for, which has a rule (FlowKey) conforming to header information of the received packet, from the flow table. As a result of the search, in a case where an entry conforming to the received packet is found, the OpenFlow switch implements processing content described in an action field of the entry in question, with respect to the received packet. On the other hand, as a result of the search, in a case where an entry conforming to the received packet is not found, the OpenFlow switch forwards the received packet to the OpenFlow controller via a secure channel, requests determination of a path of the packet based on source and destination of the received packet, receives a flow entry for realizing this, and updates the flow table.
[Patent Document 1]
Japanese Patent Kokai Publication No. JP-P2007-235444A
[Non-Patent Document 1]
Nick McKeown, and 7 others, 'OpenFlow: Enabling Innovation in Campus Networks', [online], [search conducted Jul. 17, 2009] Internet URL: http://www.OpenFlowswitch.org//documents/OpenFlow-wp-latest.pdf

SUMMARY

The entire disclosures of the abovementioned Patent Document 1 and Non-Patent Document 1 are incorporated herein by reference thereto. An analysis of related technology according to the present invention is given as follows. Forwarding nodes based on IP technology, more specifically, routing tables held by switches and routers, have been steadily growing larger, and a problem called routing information explosion has been pointed out. As a result of the increase in routes, the required amount of memory for holding routing tables increases, and, since time is taken for route determination processing, packet forwarding processing capability declines.

In MPLS, route determination time can be reduced in comparison with IP routing, but if varied forwarding policies are applied, the number of entries in a routing table increases, leading to a decline in processing capability.

As described above, curtailing the number of entries in a routing table is an important problem for forwarding nodes from the viewpoint of memory reduction and improvement in processing performance.

However, in the abovementioned source routing, since addresses of forwarding nodes 100 are contained in a packet, there is a problem in that a net data amount that can be included in a packet decreases. Accordingly, source routing is limited to certain applications such as network tests and the like, and is not used in packets (referred to below as 'data packets') that are used in communication such as with applications. It is to be noted that that information outside of net data is referred to as overhead. More specifically, the abovementioned problem can be restated as a problem where the overhead becomes large.

Furthermore, in packets used in CR-LDP, information of forwarding nodes for each forwarding action (for each 1 hop) is included, similar to the source routing in the abovementioned IP routing. As forwarding node information, for example IPv4 addresses or IPv6 addresses are used, but in this case also, when all forwarding node information is listed up within the forwarding path, the information in question increases, so that use outside of control packets is not realistic. As a result, when the forwarding path of a data packet is strictly determined, there arises a necessity to set the forwarding information for each forwarding policy inside the forwarding node, by the CR-LDP or the like.

A method of Patent Document 1 relates to an ad hoc network that does not require equipment of a mobile communication network infrastructure, and is configured by only a plurality of mobile terminal devices. Since network configurations are always changing, this method cannot realize path control in which a source can specify a path as in the abovementioned source routing.

Furthermore, in the method of Non-Patent Document 1, each forwarding node has to refer to a flow table, as in the method of referring to the routing table mentioned at the start of this specification, and it is considered that, accompanying an increase of entries, latency (delay time) occurs and loads are imposed on the nodes.

As in the above description, in the method of adding entries for each of various types of forwarding policy to a routing table or flow table, there is a problem of processing load for adding, updating, and removing entries, and of increase in the information amount in the routing table; and in source routing or the like that explicitly indicates forwarding routes, there is a problem in that the overhead becomes large, and is not suitable for transmission of data packets.

The present invention has been carried out in view of the abovementioned matter and it is an object of the invention to provide a communication system, a forwarding node, a path management server, a communication method, and a computer program, that can be implemented using a simplified forwarding table, and moreover can also be applied to path control for data packets.

According to a first aspect of the present invention, there is provided a communication system including: a path management server that configures forwarding path information by arranging identifiers for identifying communication interfaces provided in respective forwarding nodes in a forwarding path of a data transfer network or links extending between the respective forwarding nodes and neighboring nodes thereof; and a forwarding node that performs packet forwarding processing in accordance with the forwarding path information, with regard to a packet to which is added a header containing the forwarding path information.

According to a second aspect of the present invention, there is provided a forwarding node connected to a path management server that configures forwarding path information by arranging identifiers for identifying communication interfaces provided in respective forwarding nodes in a forwarding path of a data transfer network or links extending between the respective forwarding nodes and neighboring nodes thereof, wherein the forwarding node performs packet forwarding processing in accordance with the forwarding path information, with regard to a packet to which is added a header containing the forwarding path information.

According to a third aspect of the present invention, there is provided a path management server that creates forwarding path information included in a header to be added to a packet transmitted from a source communication node.

According to a fourth aspect of the present invention, there is provided a communication method including respective forwarding nodes on a forwarding path of a data transfer network receive a packet to which is added a header containing forwarding path information configured by arranging identifiers for identifying communication interfaces provided in respective forwarding nodes in a forwarding path of a data transfer network or links extending between the respective forwarding nodes and neighboring nodes thereof, and performing packet forwarding processing in accordance with the forwarding path information with regard to the packet. The present method is linked with a specific apparatus, known as a forwarding node that forms the data transfer network.

According to a fifth aspect of the present invention, there is provided a computer program(s) that is executed on a computer for configuring the abovementioned forwarding node(s) or path management server. It is to be noted that this program(s) can be recorded in a computer readable storage medium. That is, the present invention can be embodied as a computer program product.

The meritorious effects of the present invention are summarized as follows.

According to the present invention, path control of a packet is possible without using a large volume forwarding table, and furthermore, there is no pressure on net data amount. A reason for this is that a forwarding node is configured so as to perform packet forwarding processing in accordance with forwarding path information included in a packet header, and also the forwarding path information is configured by arranging identifiers of links or communication interfaces.

BRIEF DESCRIPTION OF THE DRAWINGS

FIG. 3 is a diagram showing a forwarding table recorded in a recording unit of a boundary forwarding node and an internal forwarding node.

FIGS. 18A and 18B are diagrams showing content of a path information cache included in a boundary forwarding node or an internal forwarding node of the second exemplary embodiment of the present invention.

PREFERRED MODES

First, an outline of preferred mode of the present invention is described. A forwarding node of a communication system of the present exemplary embodiment, in a case where a header including forwarding path information is assigned to a received packet, performs forwarding processing based on path information in the header.

Here, the forwarding path can be such that respective forwarding nodes disposed on the forwarding path arrange, in forwarding order, identifiers that enable identification of communication interfaces that are destinations. It is sufficient if the identifiers have a length that is adequate for uniquely ensuring a destination in each forwarding node.

The identifiers forming the forwarding path information in the present invention, different from source routing mentioned at the start of the present specification, can be described by short information, 1 byte long, for example, so that the influence on net data amount is minor or insignificant. Accordingly, it is possible to contain information describing the forwarding path for each 1 hop, with regard to not only some control packets, but all packets, such as data packets, and high level forwarding control becomes possible.

Furthermore, it is sufficient if the respective forwarding nodes hold correspondence relationships between the identifiers and communication interfaces of destinations, and since there is no necessity to hold a forwarding table such as a routing table mentioned at the start of the specification, having a large number of items, it is possible to reduce the amount of memory. Furthermore, since determination of a destination can be performed simply and quickly, it is possible to reduce packet forwarding delay also. In addition, CPU processing ability of the respective forwarding nodes can be low.

It is to be noted that addition and removal of the header including the forwarding path information described above may be performed as follows, among forwarding nodes, in a forwarding node (boundary forwarding node) disposed at a boundary with an external network. The boundary forwarding node, which receives a packet from the external network, acquires a forwarding path of the packet in question from information recorded in a separately provided path management server or the boundary forwarding node in question, and assigns a header containing information of the forwarding path to the received packet. Furthermore, the boundary forwarding node removes the header in a case of transmitting a packet to the external network.

In the following preferred modes will be further described in more detail by way of exemplified embodiments with reference to the drawings.

First Exemplary Embodiment

Figure 1:
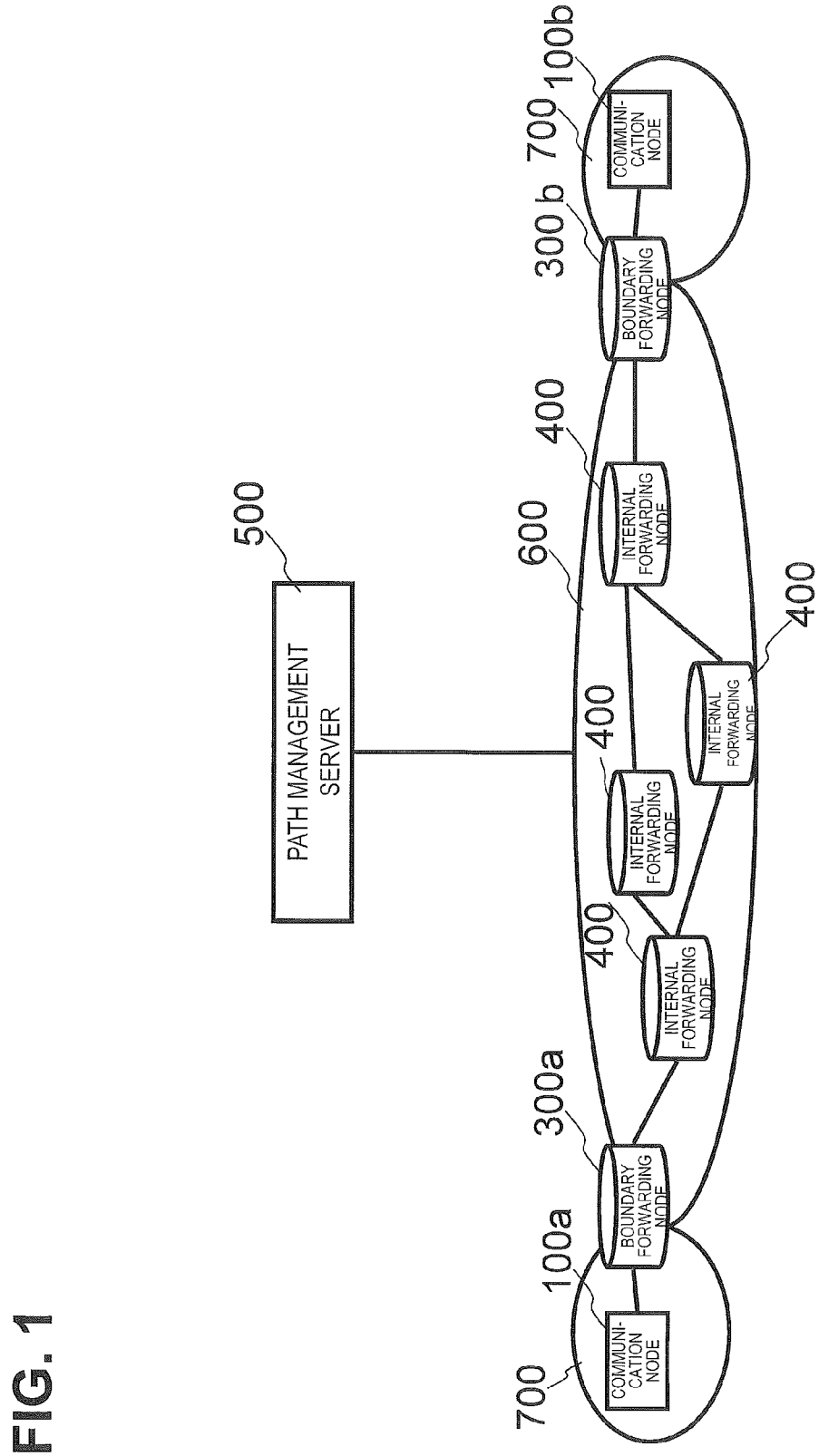
FIG. 1 is a diagram showing a communication system according to a first exemplary embodiment of the present invention.

Next, a detailed description is given concerning a first exemplary embodiment of the present invention making reference to the drawings. FIG. 1 is a diagram showing a communication system according to the first exemplary embodiment of the present invention. Referring to FIG. 1, communication nodes 100a and 100b, boundary forwarding nodes 300a and 300b, internal forwarding nodes 400, and a path management server 500 are shown.

A data transfer network 600 is a network for performing forwarding processing of a packet by a method of the present invention, and an external network 700 is a network for performing packet forwarding processing by a method different from the network 600, as in an IP network or the like. However, it can be said to be a external network if the manager of external network 700 is different from the manager of network 600 even though the forwarding methods of both networks are the same. Here, a description is given with the external network 700 as an IP network. The external network 700 is connected to the data transfer network 600 via the boundary forwarding nodes 300a and 300b.

The communication nodes 100a and 100b are each communication nodes belonging to the external network 700, and transmission and reception of packets is performed in accordance with a packet forwarding method of the external network 700. That is, in the present exemplary embodiment, these are nodes for performing transmission and reception of IP packets. Since the communication nodes 100a and 100b are similar to a general IP node, a detailed description thereof is omitted.

The boundary forwarding nodes 300a and 300b are disposed between the data transfer network 600 and the external network 700, and in a case of receiving a packet transmitted from the communication nodes 100a or 100b, assign a header including forwarding path information, to be described later, (referred to below as 'path information header'), and in addition, forward the packet in question to an internal forwarding node 400 in the data transfer network 600 based on the forwarding path information in the header.

Furthermore, in a case of receiving a packet transmitted from an internal forwarding node 400 and a determination being made from the forwarding path information in the header thereof that this is a final forwarding path within the data transfer network 600, the boundary forwarding nodes 300a and 300b remove the header from the received packet, and thereafter transmit the packet to the communication nodes 100a and 100b of the external network 700.

It is to be noted that in the following a description is given in which the forwarding path information is acquired from the path management server 500, but there is no limitation thereto, and the forwarding path information may be generated from information held within a boundary forwarding node 300.

A configuration is described below in the order of the boundary forwarding node 300a (300b), the internal forwarding nodes 400, and the path management server 500, in the present exemplary embodiment.

Figure 2:
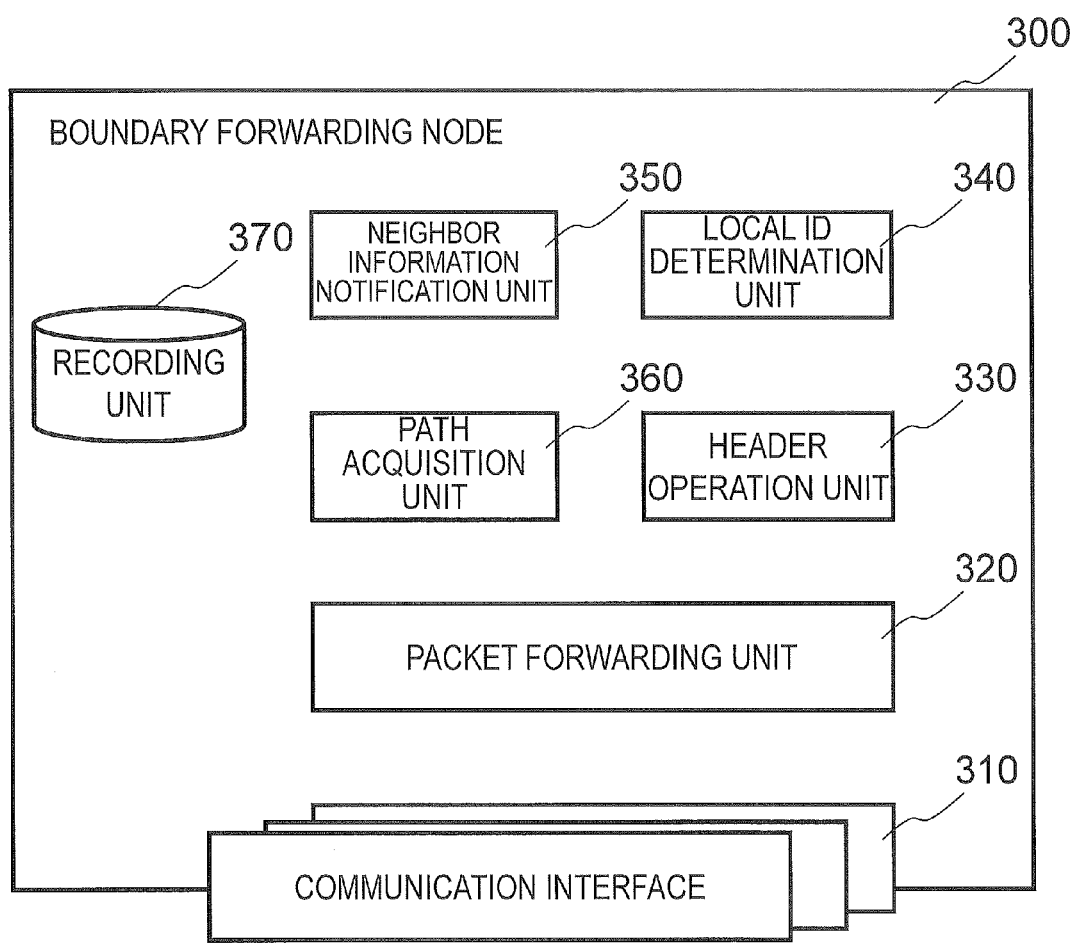
FIG. 2 is a diagram showing a configuration of a boundary forwarding node of the communication system according to the first exemplary embodiment of the present invention.

FIG. 2 is a diagram showing a configuration of the boundary forwarding nodes 300a and 300b of FIG. 1. As shown in FIG. 2, a boundary forwarding node 300 is configured by being provided with communication interfaces 310, a packet forwarding unit 320, a header operation unit 330, a local ID determination unit 340, a neighbor information notification unit 350, a path acquisition unit 360, and a recording unit 370.

A communication interface 310 is an interface for performing transmission and reception of packets, and is realized by a Network Interface Card (NIC) such as a LAN card or the like, and software (a driver) for driving the card. However, there is no limitation to only a physical interface as mentioned above, and a logical interface is also possible. In this case, it is possible to use one physical interface and make it operate as if a plurality of interfaces were provided.

A boundary forwarding node 300 is provided with one or more physical interfaces as described above, or a logical interface. Each communication interface 310 is connected with an internal forwarding node 400 within the data transfer network or another boundary forwarding node 300. Furthermore, some of the communication interfaces 310 are also connected to a communication node 100 of the external network 700. Furthermore, some of the communication interfaces 310 are also connected to the path management server 500. The path management server 500 may be disposed within the data transfer network 600, and connections may be via a dedicated network of the path management server 500.

The packet forwarding unit 320, in a case where a path information header is assigned to a received packet, is provided with a function that transmits a header based on information recorded in the recording unit 370, and the path information header.

A forwarding table is recorded in the recording unit 370, as shown in FIG. 3, with a local ID, a communication interface that forms a destination, and information corresponding to an identifier of an internal forwarding node 400 or a neighbor boundary forwarding node 300 connected with the communication interface 310 in question, as one entry. The packet forwarding unit 320 can forward a packet to a next node corresponding to the local ID.

It is to be noted that in the following, the boundary forwarding node 300 and the internal forwarding node 400 are generically referred to as a forwarding node. Furthermore, nodes that are directly connected (communication node 100, boundary forwarding node 300, internal forwarding node 400) are referred to as neighboring nodes.

FIG. 3 is a diagram showing a forwarding table recorded in a recording device of the boundary forwarding node 300 and the internal forwarding node 400. In the present exemplary embodiment as shown in FIG. 3, as a local ID, an identifier (link ID) is used that is assigned to a physical link or a logical link, between neighboring forwarding nodes or between the boundary forwarding node 300 and the communication node 100a (100b). Therefore, the link ID is set in a field 'local ID'. In a field 'interface' indicating a communication interface as destination, information that identifies the communication interface 310 connected to a link to which the link ID is assigned, is set. Furthermore, in the example of FIG. 3, an identifier of a forwarding node connected to the link is set in a field 'next hop' indicating information of a neighboring node.

It is to be noted that in a case where the communication interface as destination is connected to a communication node 100a (100b) that performs communication by IP, an IP address of the communication node 100a (100b), for example, can be used as the identifier of the 'next hop' field. On the other hand, in a case of the boundary forwarding node 300 or the internal forwarding node 400, a uniquely assigned identifier (for example, Node_1 or Node_2 of FIG. 3) is used. The identifier of the forwarding node may be set in advance, or a method may be used in which the identifier is set from an external node such as the path management server 500 or the like. Furthermore, the identifier of the 'next hop' field need not necessarily be used in forwarding processing and can be omitted.

It is possible to use information identifying the communication interface 310 as the local ID. Since it is desirable that information identifying the communication interface 310 can be described using a small amount of information (for example, about 1 to 2 bytes), in a case where the information for identifying the communication interface 310 is long (for example, in a case where a communication interface name or the like is used), another identifier that can be described with a short piece of information such as 1 byte or the like is separately assigned and applied as the local ID. It is to be noted that where no particular description is given herein, the description is for using a link ID as the local ID.

Since there are basically of the order of several tens of communication interfaces, which are provided with an L3 switch or router that performs general layer 3 forwarding processing, and an L2 switch that performs layer 2 forwarding processing, the link identifier and the communication interface identifier can be adequately expressed by 1 byte. In a case of a long item of information where an actual communication interface identifier requires several bytes, an identifier of a range than can be contained in 1 byte or in 2 bytes may be separately created and associated with the communication interface identifier.

It is to be noted that the forwarding table of FIG. 3 is shown as an example for concisely describing the present invention, and other information may be further associated with the respective entries and recorded.

Figure 4:
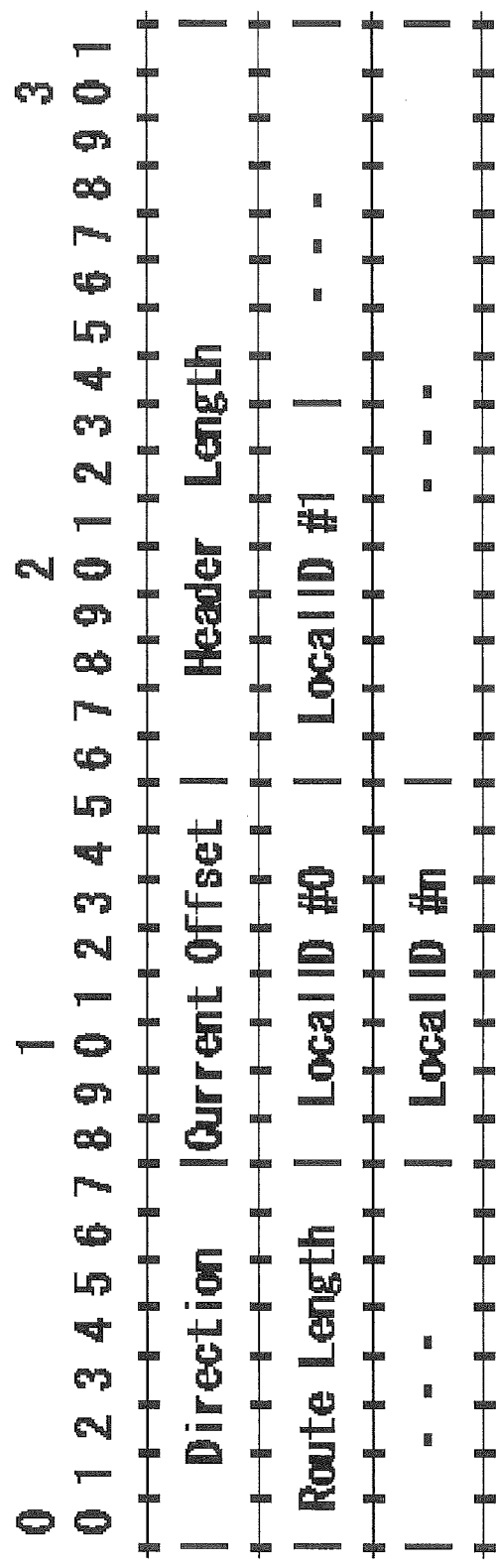
FIG. 4 is an example of a format of a header for path forwarding added to a boundary forwarding node.

FIG. 4 is one example of a format for a path information header used in the present exemplary embodiment. In FIG. 4, 'Direction' indicates a forwarding direction. For example, '1' indicates a regular (forward) direction with respect to forwarding, and '2' indicates a reverse direction with respect to forwarding. In 'Current Offset', offset information is set for local ID information to be referred to when forwarding (units are bytes). The value is indicated by the number of offset bytes from 'Local ID #0'. When a path information header is assigned in the boundary forwarding node 300, the value of the 'Current Offset' is set to '0'. 'Header Length' indicates the length of the header after 'Route Length' in number of bytes. In consideration of packet formation, a 4 byte unit value is used. In a case where the end of the net data does not fit a 4 byte unit boundary, stuffing (padding) is performed (dummy information with a setting of 0 is post-positioned). 'Route Length' indicates the total number of bytes of path information indicated by a list of local IDs following thereafter. In 'Local ID #n', the local ID, which is to be referred to as a destination by the boundary forwarding node 300 of the nth hop or the internal forwarding node 400, is set. The format of the abovementioned FIG. 4 is only an example, and information in various types of modified formats may be contained.

As described above, by using a local ID that is unique in a local range among neighboring forwarding nodes or within a forwarding node, as information of the forwarding path, it is possible to reduce the amount of information in the path information header. It is to be noted that in the present exemplary embodiment, each of the local IDs was made to have 1 byte, but there is a possibility of not being able to represent a logical link by 1 byte. In this case, the uppermost bit of the 'Local ID #n' may be used as a local ID extension flag indicating whether the local ID has a 1 byte notation or a 2 byte notation. That is, in this case, when the uppermost bit is 0, the local ID may be interpreted as a 1 byte identifier, and when the uppermost bit is 1, the local ID may be interpreted as a 2 byte identifier.

In a case where the 'Direction' field of the path information header of a received packet is '1', that is, when a forwarding in a regular direction is indicated, the packet forwarding unit 320 refers to the 'Current Offset' of the path information header, and after referring to a corresponding local ID and determining a communication interface 310 of a destination, the length amount (for example, 1 byte or 2 bytes) of a local ID referring to the value of the 'Current Offset' is increased, and a packet is transmitted from the determined communication interface 310. On the other hand, in a case where the 'Direction' is '2', that is, when forwarding in a reverse direction is indicated, reference is made to the 'Current Offset' of the path information header, reference is made to a local ID that is one ahead of the corresponding local ID, and the communication interface 310 that is the destination is determined. Thereafter, a reduction is made by a length amount of the local ID referring to the value of the 'Current Offset' of the path information header, and a packet is transmitted from the determined communication interface 310.

It is to be noted that a description is given in the present exemplary embodiment in which forwarding is performed in both directions, but in the communication system, forwarding in only one direction is also possible. In this case, '1' may be set at all times in the 'Direction' field, or the field in question may not be present.

The header operation unit 330 is provided with a function that, in a case of receiving a packet from the external network 700, acquires, from a path acquisition unit 360, path information for each 1 hop as far as the boundary forwarding node 300 that is an exit from the boundary forwarding node in question, forms a path information header shown in FIG. 4, and assigns the path information header to the packet. For example, when the path information header is assigned, the header operation unit 330 sets '1' indicating forwarding in a regular direction in 'Direction', sets '0' in 'Current Offset', and sets path information (local ID) for each 1 hop, which has been acquired, in 'Local ID #n'. Furthermore, the header operation unit 330 sets appropriate values for other respective fields in accordance with a rule described above.

The header operation unit 330 is provided with a function that removes the path information header, in a case of forwarding a packet that has been assigned a path information header to an external network 700.

The local ID determination unit 340 is provided with a function that performs information exchange between the boundary forwarding node 300 in question and a neighboring node, and determines a non-duplicating link ID. For example, in the following method, it is possible to avoid a duplicated setting of a link ID with a neighboring node.

First, a forwarding node proposes a link ID candidate by transmitting to a neighboring node a packet in which a link ID is set, which is not the link ID already assigned to itself. The neighboring node to which the link ID is proposed confirms whether or not the link ID is duplicated within its own node, and in a case where there is no duplicated link ID, transmits a response packet in which the proposed link ID and identifier information of its own node are set, to a forwarding node that is the proposal source. On the other hand, in a case where there is a duplicated link ID in the neighboring node, transmission is performed of a response packet in which its own node identifier is set and information indicating that there is duplication. This processing is repeated until there is no duplicated link ID.

The link ID determined in this way and the neighboring node information are recorded as a forwarding table in the recording unit 370.

An example of a method of determining the link ID was shown above, but the link ID may also be determined by another method. For example, with the path management server 500 or the like, other nodes may be determined, and notification given to respective forwarding nodes.

It is to be noted that in a case of using an identifier of a communication interface as a local ID, when forwarding in a reverse direction as described above is unnecessary, it is possible to omit negotiation with the abovementioned neighboring nodes. On the other hand, in a case where forwarding in a reverse direction is necessary, when an identifier of an interface is used as a local ID, by performing negotiation with neighboring nodes it is possible to acquire information as to which communication interface of neighboring forwarding nodes is connected to its own communication interface, and similar to the case of using the link ID as described above, it is possible to select an interface according to a forwarding direction that is in accordance with Direction.

The neighbor information notification unit 350 is provided with a function for transmitting neighbor information containing the link ID determined as the local ID by the local ID determination unit 340, the identifier of a neighboring node connected to the link, and a self-identifier, to the path management server 500. In a case where the communication nodes 100*a* and 100*b* of the external network 700 are connected to the link, information by which a determination of a node of the external network can be made, is added to the information. Furthermore, for path calculation by the path management server 500, the neighbor information may include information such as a band of each link, reliability, and congestion state, and neighboring node malfunction information and the like. A trigger for transmitting the neighbor information to the path management server 500 may be at timing at which the processing for determination of the local ID is completed, or transmission may be performed at a prescribed time interval. Furthermore, in a case of a transmission including the link information and the neighboring node malfunction information, the transmission may be triggered by a change occurring in this information.

The path acquisition unit 360 is provided with a function that, when a packet is received from the communication nodes 100*a* and 100*b* of the external network 700, transmits a path request signal containing an identifier of the boundary forwarding node 300 and information of the received packet to the path management server 500, and acquires the forwarding path of the packet in question. The information of the received packet is information that may affect the forwarding path determination, and in the simplest case is only a destination address. However, in a case of implementing more precise path control, in addition to the destination address, it is possible to include some or all of information such as: a source address, protocol information that is contained after the header of the packet in question, a destination port number when using TCP (Transmission Control Protocol) or UDP (User Datagram Protocol), and a source port number. In addition, other information may be included.

As a result of transmitting the path request signal, a path response signal is returned from the path management server 500. Information listing local IDs for each 1 hop is contained in the forwarding path information included in the path response signal, in accordance with the forwarding path with the boundary forwarding node 300 as starting point.

It is to be noted that information that may affect the forwarding path, such as the destination address and the like, and information corresponding to a group of local IDs indicating a forwarding path can be set beforehand in the boundary forwarding node 300 in question, and can be received from the path management server in advance. In this case, the path acquisition unit 360 acquires the forwarding path information from information set internally, not the path management server 500.

Furthermore, in the abovementioned example, the boundary forwarding node 300 has as a starting point a local ID that can identify a communication interface that is a first forwarding destination, but the starting point may be a local ID that can identify a communication interface 310 that has received the packet.

The recording unit 370 holds a forwarding table shown in FIG. 3, and this is referred to by the packet forwarding unit 320, the local ID determination unit 340, and the neighbor information notification unit 350.

The internal forwarding node 400 is disposed inside the data transfer network 600, and is provided with a function such that, in a case of receiving a packet transmitted from a neighboring node, the packet in question is transmitted to a neighboring node inside the data transfer network 600 based on information of the path information header in the packet.

Figure 5:
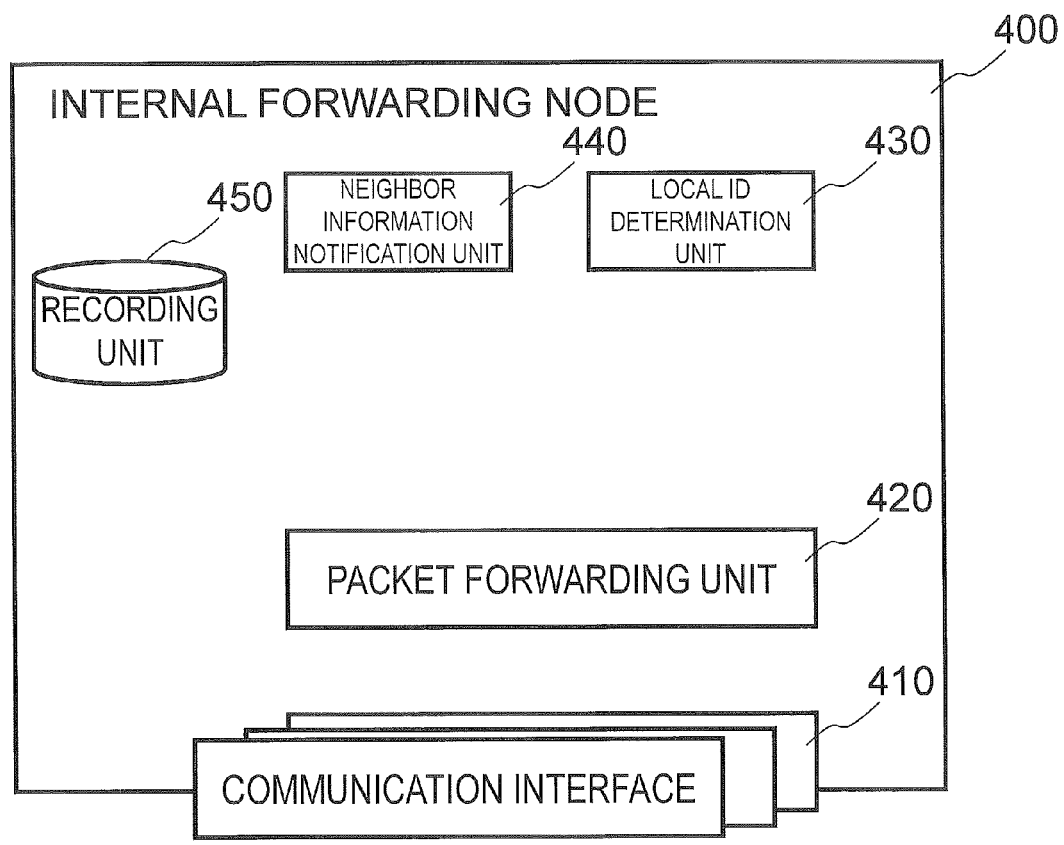
FIG. 5 is a diagram showing a configuration of an internal transfer node of the communication system according to the first exemplary embodiment of the present invention.

FIG. 5 is a diagram showing a configuration of the internal forwarding node 400 of FIG. 1. The internal forwarding node 400, as shown in FIG. 5, is configured to be provided with communication interfaces 410, a packet forwarding unit 420, a local ID determination unit 430, a neighbor information notification unit 440, and a recording unit 450.

The communication interfaces 410, the packet forwarding unit 420, the local ID determination unit 430, the neighbor information notification unit 440, and the recording unit 450 are respectively equivalent to the communication interfaces 310, the packet forwarding unit 320, the local ID determination unit 340, the neighbor information notification unit 350, and the recording unit 370, of the boundary forwarding node 300, and detailed descriptions thereof are omitted here.

That is, the internal forwarding node 400 can be regarded as having the header operation unit 330 and the path acquisition unit 360 taken away from the boundary forwarding node 300. Conversely, the boundary forwarding node 300 can be said to be a forwarding node obtained by adding the header operation unit 330 and the path acquisition unit 360 to the internal forwarding node 400.

The path management server 500 collects neighbor information notified from boundary forwarding nodes 300 and internal forwarding nodes 400, and configures network topology information describing connection relationships of the internal forwarding nodes 400 and the boundary forwarding nodes 300 inside the data transfer network 600. The network topology information also includes connection information for the communication nodes 100*a* and 100*b* connected to the boundary forwarding nodes 300. In a case where information (congestion state, malfunction state, and the like) indicating the state of forwarding nodes and links between respective forwarding nodes is included in the notified path information, this is also associated with the connection information and managed. A function is provided that, in a case where forwarding path information is requested from a boundary forwarding node 300, performs a calculation obtaining an appropriate forwarding path using information included in the path request and the network topology information configured internally, and with the boundary forwarding node 300 that performed the path request as a starting point, responds with information listing local IDs (link IDs) for each 1 hop, for a forwarding path as far as the boundary forwarding node 300 that is an exit to the external network 700.

Figure 6:
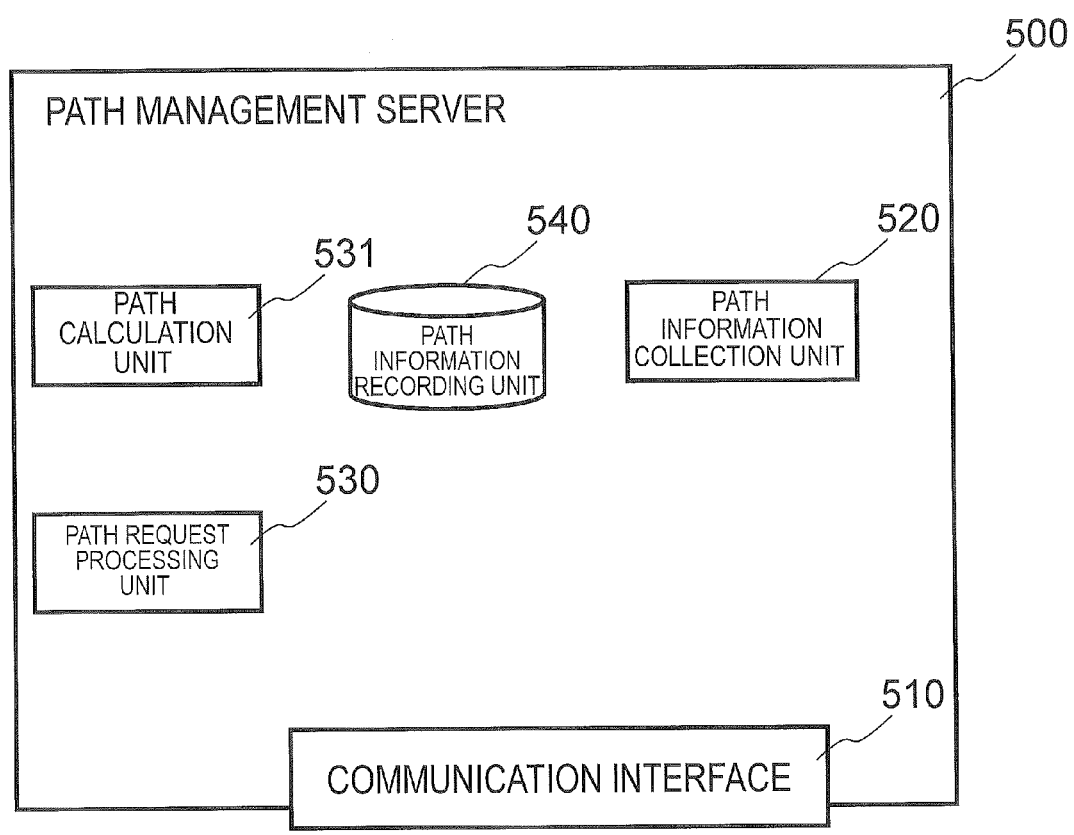
FIG. 6 is a diagram showing a configuration of a path management server of the communication system according to the first exemplary embodiment of the present invention.

FIG. 6 is a diagram showing a configuration of the path management server 500 of FIG. 1. The path management server 500, as shown in FIG. 6, is configured to be further provided with a communication interface 510, a path information collection unit 520, a path request processing unit 530, a path calculation unit 531, and a path information recording unit 540.

The communication interface 510 is an interface for performing transmission and reception of packets. As described above, realization is possible by an NIC such as a LAN card, for example, and by software (a driver) for operation thereof.

When the path information collection unit 520 receives neighbor information sent from the boundary forwarding node 300 and the internal forwarding node 400, it uses an identifier of the node that transmitted the neighbor information, contained in the neighbor information, a local ID (link ID), and a neighboring node identifier, to configure network topology information within the data transfer network 600, in the path information recording unit 540. In a case where the neighbor information includes accompanying information such as link band, reliability, congestion state, and neighboring node malfunction information, the accompanying information is associated with and recorded in the network topology information. These items of information can be used, for example, as a link cost when calculating a path, to be described later.

Figure 7:
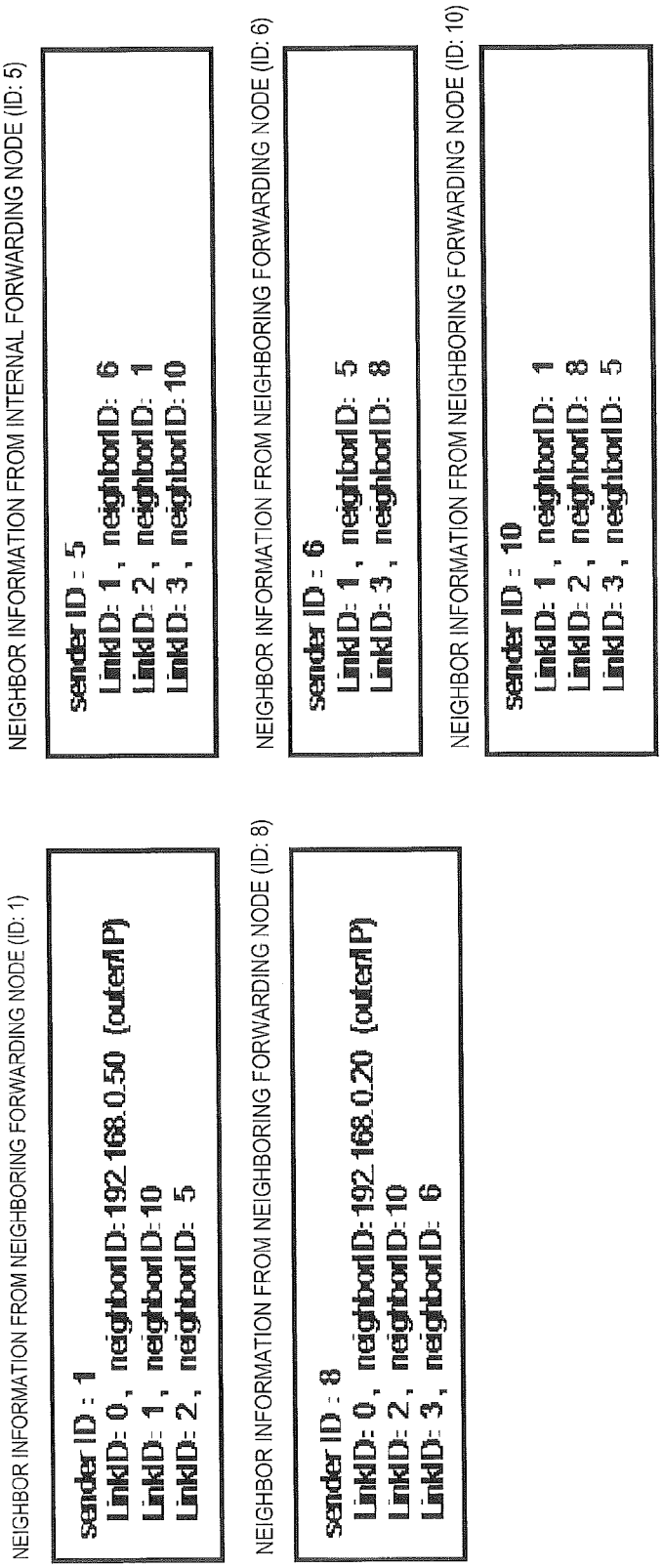
FIG. 7 is a diagram showing neighbor information from respective forwarding nodes.
Figure 8:
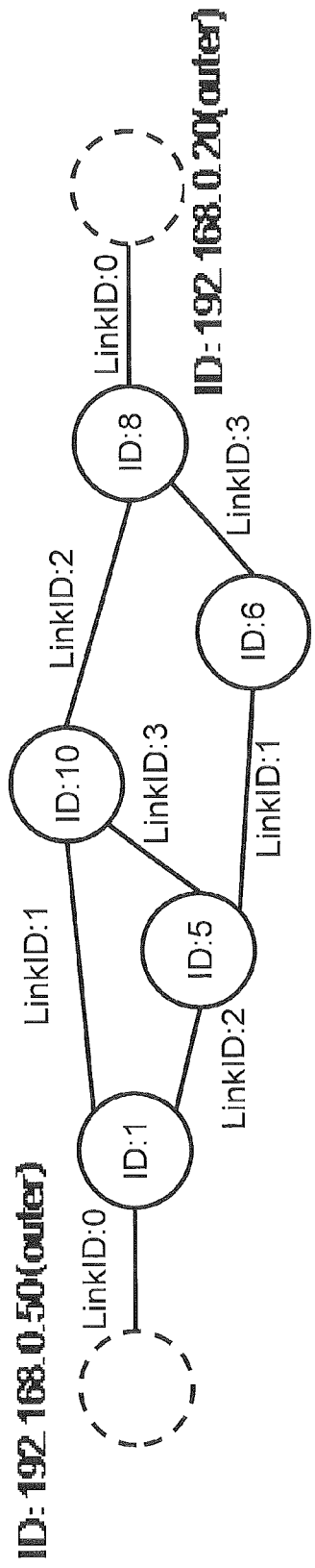
FIG. 8 is an example of a network topology configured from the neighbor information of FIG. 7.

FIG. 7 is an example of neighbor information received from respective forwarding nodes. FIG. 8 is an example of a network topology configured from the neighbor information of FIG. 7. In the example of FIG. 8, for simplicity, the accompanying information is omitted. Furthermore, the external network is assumed to be an IP network.

In FIG. 7, 'sender ID' indicates an identifier of a forwarding node that transmits neighbor information. In FIG. 7, 'Link ID' indicates a link ID assigned to a link to which the forwarding node is connected. In FIG. 7, 'neighbor ID' indicates an identifier of a neighboring node connected to the link. Since the external network is assumed to be an IP network, an IP address is used as an identifier of a communication node 100. Furthermore, since negotiation is carried out among neighboring nodes as described above, a link ID is not set to be duplicated in one forwarding node, but it is permitted for non-neighboring forwarding nodes to use the same link ID. For example, a link with Link ID=1 is used between a node of ID=1 and a node of ID=10, and between a node of ID=5 and a node of ID=6, but in each forwarding node it is possible to identify a link uniquely. That is, it is sufficient if the length of the link ID has a length that is enough to ensure uniqueness within one forwarding node.

In a case where neighbor information of FIG. 7 is obtained, for example, the path information collection unit 520 configures the network topology as shown in FIG. 8, and records the topology in the path information recording unit 540.

The link ID is used in the neighbor information of FIG. 7 and in the network topology information of FIG. 8 that is configured based on the neighbor information of FIG. 7, but when other information such as an interface identifier is used as a local ID, it is possible to configure the network topology information in the same way.

The path request processing unit 530 receives a path request signal transmitted from the boundary forwarding node 300, and information included therein, and notifies same to the path calculation unit 531 together with the path calculation requests.

When the path request processing unit 530 acquires the forwarding path information (information in which the link ID for each hop is listed in order of the forwarding path) from the path calculation unit 531, the path response signal containing the forwarding path information is transmitted to the boundary forwarding node 300 that is a source of the path request signal.

When notified of the path calculation request from the path request processing unit 530, with the identifier of the boundary forwarding node 300 that is the path request source and the destination address, both of which are inputted, as respective start and end points, the path calculation unit 531 uses the network topology information as in FIG. 8 that is recorded in the path information recording unit 540, to perform calculation of the path. In the path calculation, an algorithm for obtaining the shortest path known as the Dijkstra method can be applied. However, it is also possible to apply other algorithms.

In a case where the source address of the IP packet is included in the path calculation request, the source address (that is, the identifier of the communication node 100a or 100b that is the source of the packet received by the boundary forwarding node 300) may also be used as a starting point. Furthermore, in performing the path calculation as described above, the path calculation may be performed using other information such as a TCP or UDP destination/source port number or the like. In addition, information (band, congestion state, and the like) accompanying the link, or information such as an identifier of a malfunctioning boundary or internal forwarding node may also be used.

The network topology information as shown in FIG. 8, from the path information collection unit 520, is recorded in the path information recording unit 540. The network topology information is referred to, from the path calculation unit 531 in order to calculate the path.

The communication interfaces 310, 410, and 510, described above in the exemplary embodiment of the present invention, can be implemented, as mentioned above, by an NIC such as a LAN card for example, or by software (a driver) that drives the NIC.

Furthermore, the recording unit 370, the recording unit 450, and the path information recording unit 540 can be realized by a device that can record information, such as a semiconductor memory, a hard disk drive or the like.

Other function blocks can be realized by a computer program (software) executed in one or a plurality of CPUs installed in respective devices, or by hardware. Some of the processing to be performed by the functional blocks may be implemented by software, and the remainder may be implemented by hardware.

Next, a detailed description is given concerning operation of the present exemplary embodiment, making reference to the drawings. First, operation of the boundary forwarding node 300 is described.

Figure 9:
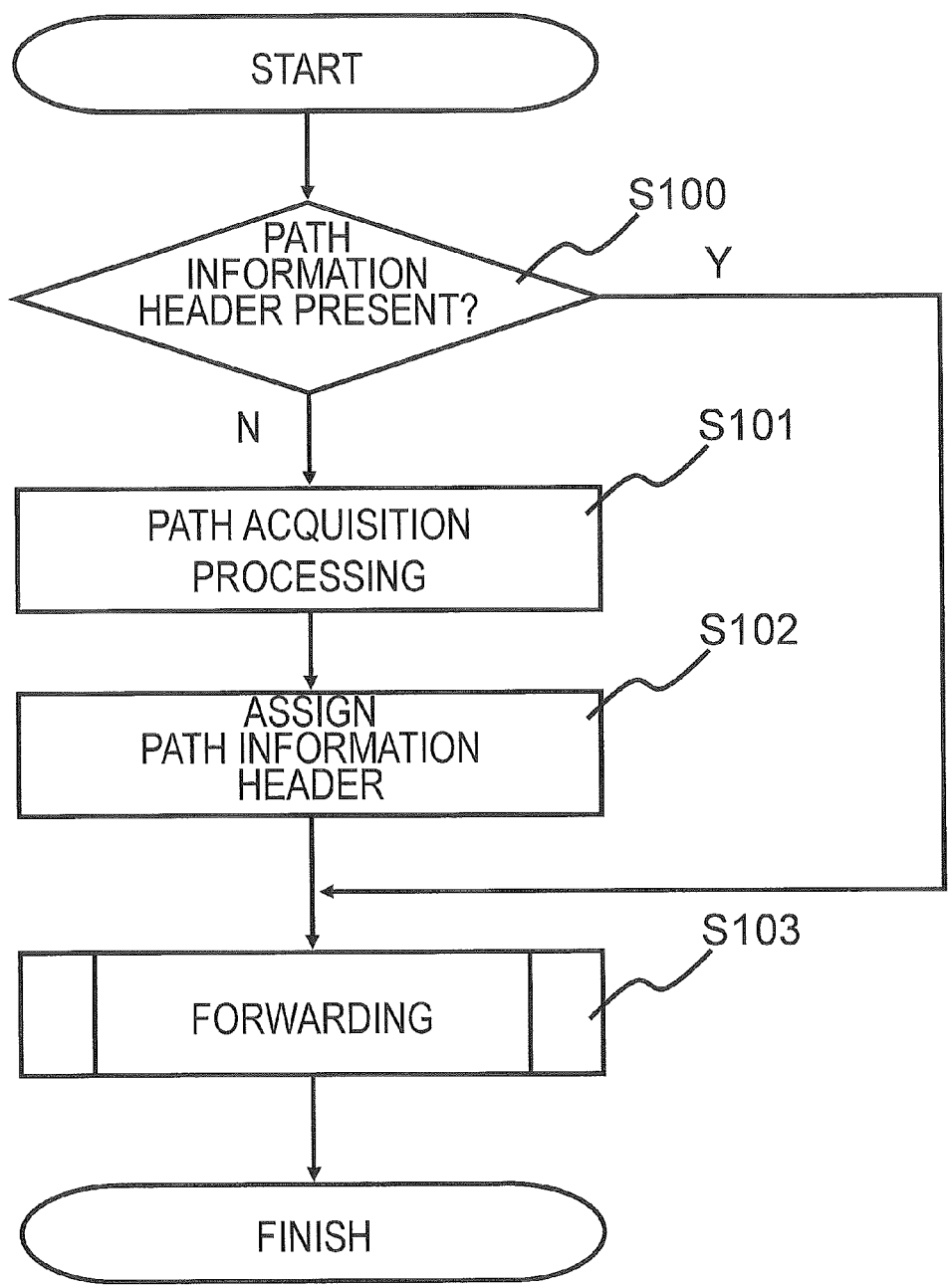
FIG. 9 is a flowchart showing operation when a boundary forwarding node receives a packet.

FIG. 9 shows processing in a case where the boundary forwarding node 300 receives a packet from the data transfer network 600 or the external network 700.

First, on receiving a packet via the communication interface 310, the packet forwarding unit 320 checks whether or not a path information header is assigned to the packet (step S100).

In a case where the path information header is assigned, control proceeds to 'Y', and forwarding processing is performed in accordance with the path information header (step S103). On the other hand, in a case where the path information header is not assigned, control proceeds to 'N', and path acquisition processing that acquires the forwarding path information by transmitting a path request signal to the path management server 500, from the path acquisition unit 360, is performed (step S101).

When the acquisition of the forwarding path information is complete, the header operation unit 330 sets the local ID to the local ID field ('Local ID #n') of the path information header of FIG. 4, in accordance with the order of the forwarding path of the acquired forwarding path information. Furthermore, the header operation unit 330 sets the 'Direction' to '1' and the 'Current Offset' to '0'. On setting other fields also to appropriate values, the header operation unit 330 assigns the path information header to the head of the received packet (step S102).

The packet forwarding unit 320 implements forwarding processing in accordance with the path information header described above (step S103).

Figure 10:
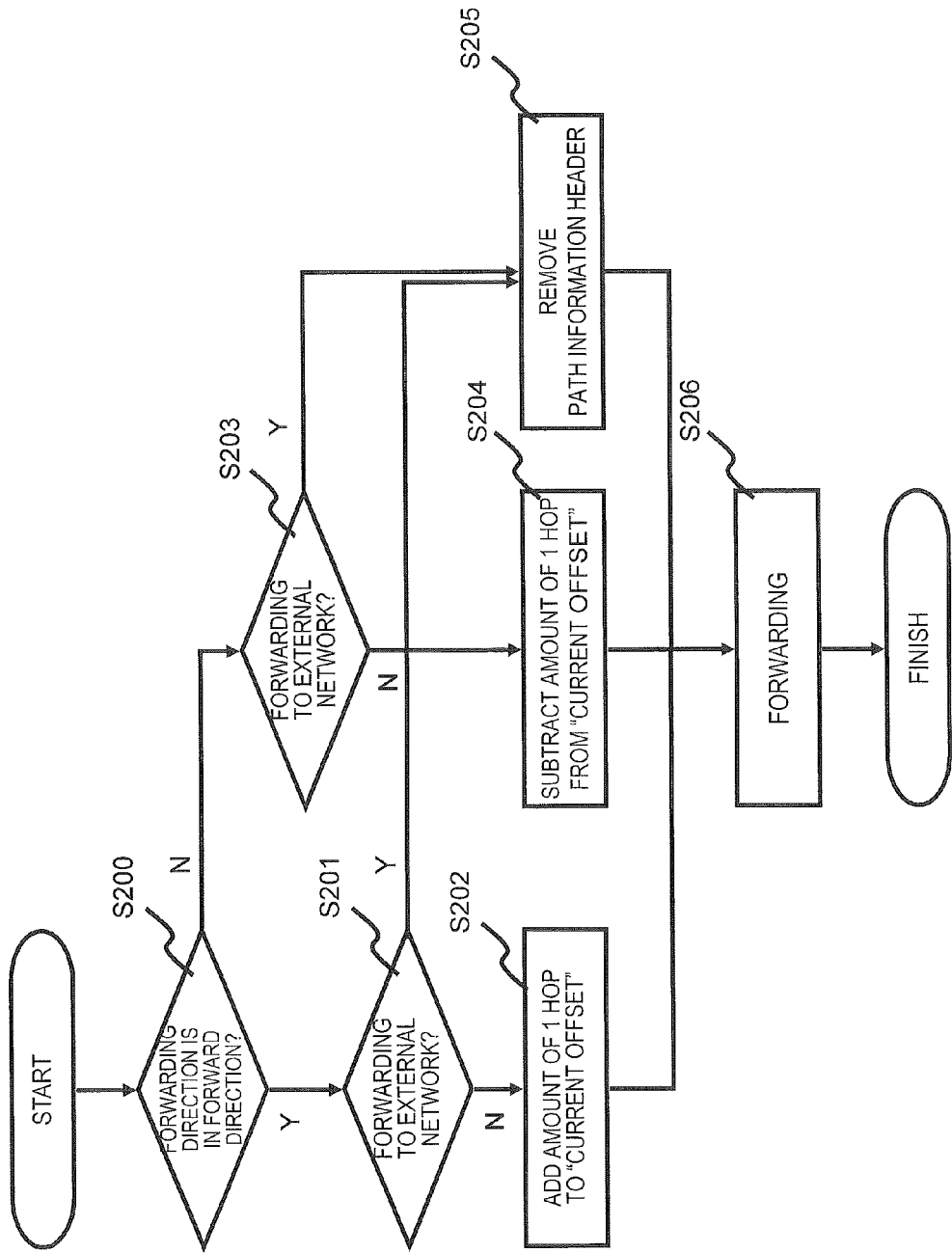
FIG. 10 is a flowchart showing details of forwarding processing of FIG. 9.

FIG. 10 is a flowchart representing details of forwarding processing of step S103 of FIG. 9. Referring to FIG. 10, first the packet forwarding unit 320 checks the 'Direction' field of the path information header and decides whether to forward in a regular (forward) direction or to forward in a reverse direction (step S200).

In a case where the value of the 'Direction' field indicates forwarding in a regular direction ('1'), control proceeds to 'Y', and a decision is made as to whether or not the destination of the packet in question is the external network 700 (step S201). In forwarding in the regular direction, the decision as to whether to forward to the external network 700 can be decided by comparing 'Current Offset' and 'Route Length'. As another decision method, a value may be used that can distinguish whether or not the local ID is to be forwarded to the external network 700, and information indicating an end may be contained after the final local ID in the path information header. Other methods may also be used.

In a case of a decision not to forward to the external network 700, control proceeds to 'N', and the number of bytes of 1 hop are added to the 'Current Offset' of the path information header (step S202). The number of bytes of 1 hop is the number of bytes of the 'Local ID #n' currently being referred to. Here, the local ID that is referred to before adding to the value of the 'Current Offset', is held.

The packet forwarding unit 320 uses the local ID that is held and performs forwarding processing of the packet in a regular direction (step S206). Specifically, a communication interface 310 that is to be a destination is determined from the local ID using the information of the forwarding table recorded in the recording unit 370, and the packet is forwarded from the communication interface 310 in question.

On the other hand, in a case where in step S200 the value of the 'Direction' field indicates forwarding in a reverse direction ('2'), control proceeds to 'N', and a decision is made as to whether or not the forwarding destination of the packet in question is the external network 700 (step S203). In forwarding in the reverse direction, the decision as to whether or not to forward to the external network 700 can be decided according to whether or not the value of the 'Current Offset' is '0' (when the value is '0', the transfer is to the external network). This is a decision method for a case where a link ID for links between the communication nodes 100a and 100b that first transmit the packet and the boundary transfer node 300 that receives the packet is not used as the first local ID. In a case where the link ID is used as the first local ID, when the present 'Current Offset' has a value with 1 hop amount subtracted of '0', a decision can be made to forward to the external network. As another decision method when forwarding in a reverse direction, a value may be used that can distinguish whether or not the local ID is to be forwarded to the external network 700, and information indicating a start may be contained before the first local ID in the path information header. Other methods may also be used.

In a case of a decision not to forward to the external network 700, control proceeds to 'N', and 1 hop amount is subtracted from the value of the 'Current Offset' of the path information header (step S204). Here, the local ID, which is referred to by the 'Current Offset' after the subtraction, is held.

The packet transfer unit 320 uses the local ID that is held and performs forwarding processing of the packet in a reverse direction (step S206). Specifically, a communication interface 310 that is to be a forwarding destination is determined from the local ID using the information of the forwarding table recorded in the recording unit 370, and the packet is forwarded from the communication interface 310 in question.

When a decision is made to forward to the external network 700 in the abovementioned step S201 or S203, control proceeds to 'Y' in each case, and processing of removing the path information header is performed by the header operation unit 330 (step S205). Here, before removal of the path information header, the local ID that is a forwarding destination is held.

The packet transfer unit 320 uses the local ID that is held and performs forwarding processing of the packet to the external network 700 (step S206). Specifically, the communication interface 310 that is to be the forwarding destination is determined from the local ID using the information of the forwarding table recorded in the recording unit 370, and the packet is forwarded from the communication interface 310 in question.

It is to be noted that in a case where the 'Direction' field is not used and forwarding is always in the regular (forward) direction, the decision concerning the forwarding direction of step S200 is unnecessary, and it is sufficient to perform a decision as to whether or not to forward to the external network of step S201.

Next, operation of the internal forwarding nodes 400 is described.

Figure 11:
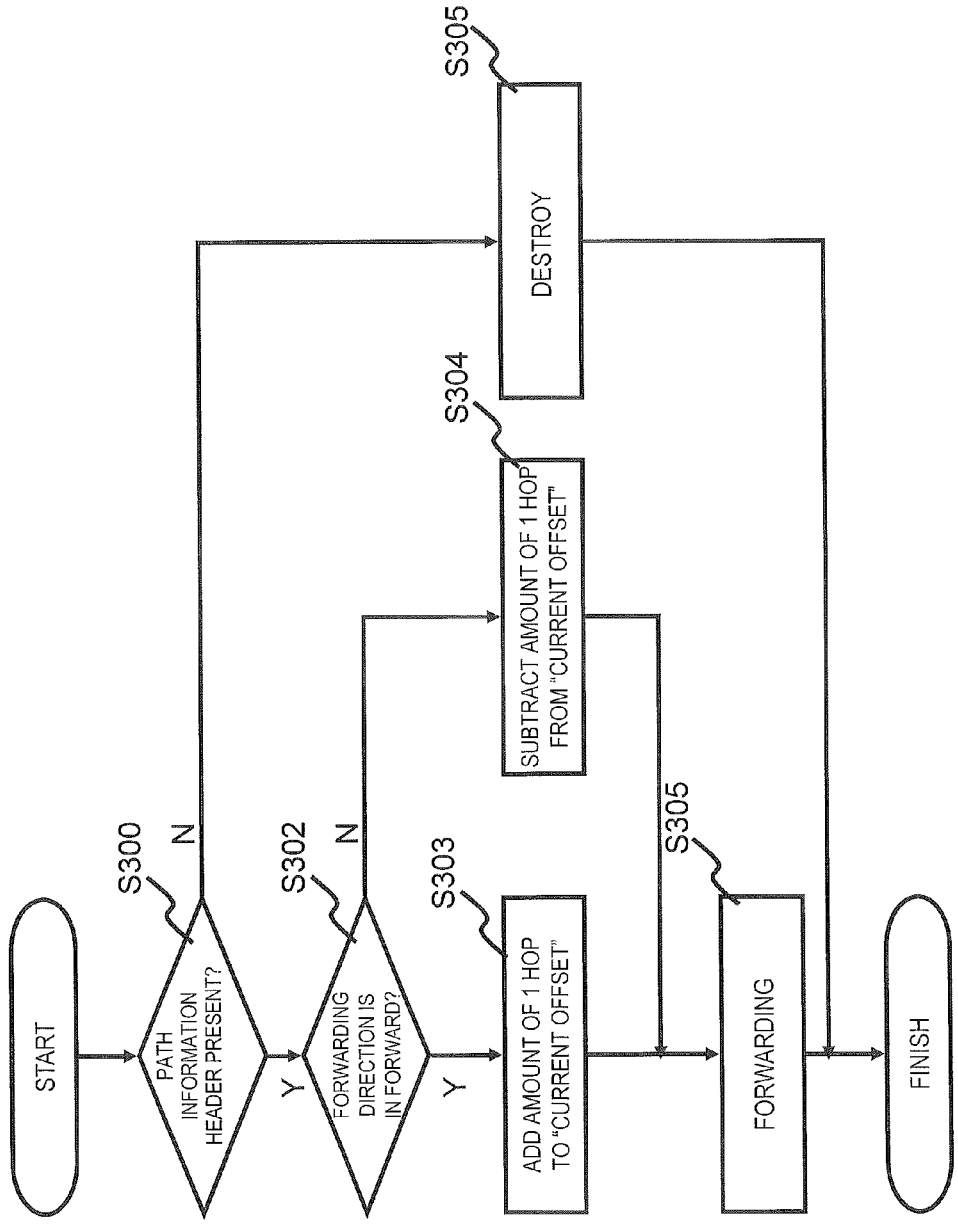
FIG. 11 is a flowchart showing operation when an internal forwarding node receives a packet.

FIG. 11 shows processing in a case where an internal forwarding node 400 receives a packet from the boundary forwarding node 300 of the data transfer network 600 or a other internal forwarding node.

Referring to FIG. 11, first, on receiving a packet via the communication interface 410, the packet forwarding unit 420 checks whether or not a path information header is assigned to the packet in question (step S300).

In a case where the path information header is assigned, control proceeds to 'Y', a check is made of the 'Direction' field of the path information header, and a decision is made as to whether to forward in a regular direction or to forward in a reverse direction (step S302). On the other hand, in a case where the path information header is not assigned, control proceeds to 'N', and the received packet is dropped (step S301).

In a case where the value of the 'Direction' field checked in step S302 indicates forwarding in a regular direction ('1'), control proceeds to 'Y', and the number of bytes of 1 hop are added to the 'Current Offset' of the path information header (step S303). Here, the local ID that is referred to before adding to the value of the 'Current Offset' is held.

On the other hand, in a case where the value of the 'Direction' field checked in step S302 indicates forwarding in a reverse direction ('2'), control proceeds to 'N', and the number of bytes of 1 hop are subtracted from the 'Current Offset' of the path information header (step S304). Here, the local ID, which is referred to by the 'Current Offset' after subtraction, is held.

Finally, forwarding processing of the packet is performed based on the local ID held in the abovementioned step S303 or step S304. Specifically, the communication interface 410 that is to be the destination is determined from the local ID using the information of the forwarding table recorded in the recording unit 450, and the packet is forwarded from the communication interface 410 in question (step S305).

It is to be noted that in a case where the 'Direction' field is not used and forwarding is always in a regular direction, the decision regarding the forwarding direction in steps S320 is unnecessary, and the 'Current Offset' addition processing of step S303 is always performed.

Next, a description is given concerning processing of giving notification of determination of the local ID by the boundary forwarding node 300 and the internal forwarding node 400 and a result thereof, as neighbor information to the path management server 500.

Figure 12:
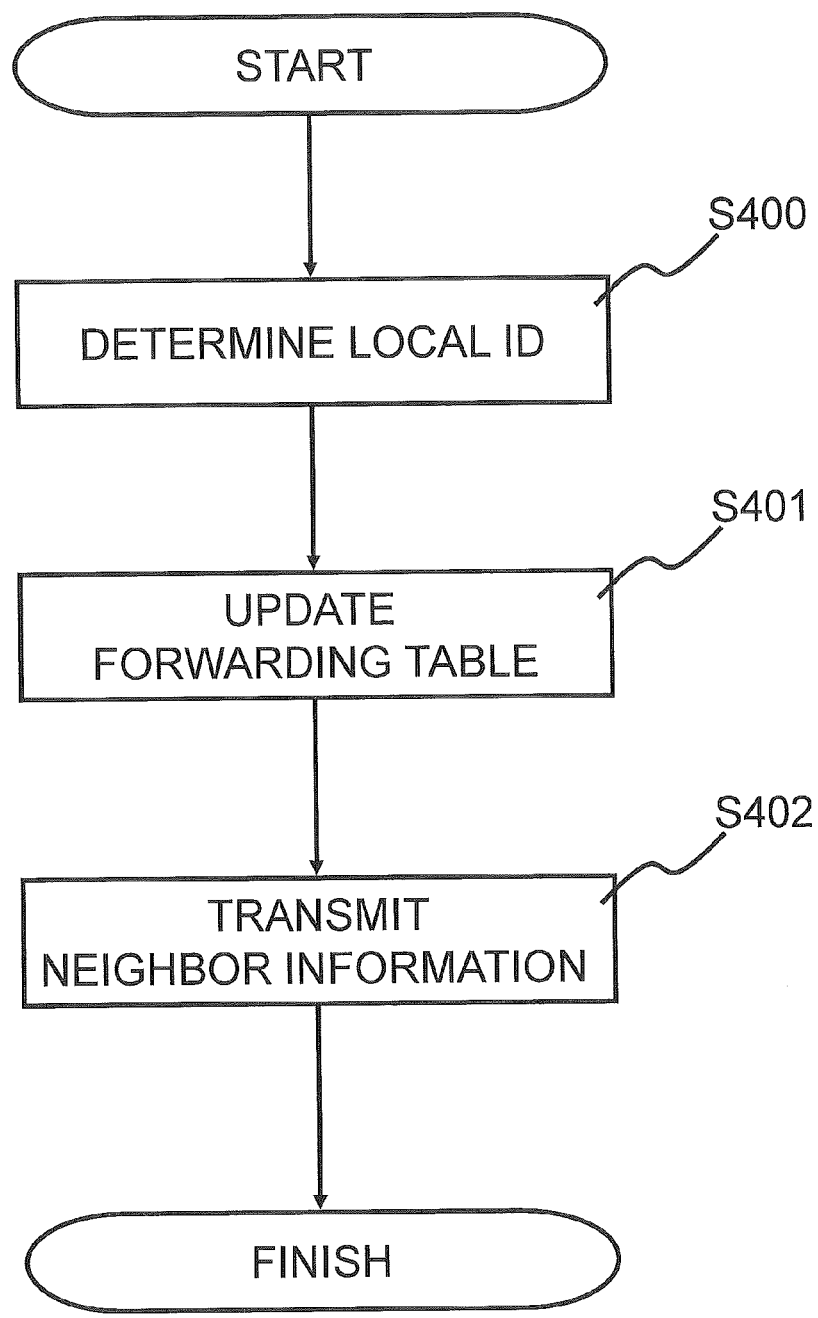
FIG. 12 is a flowchart showing an operation in which a boundary forwarding node and an internal forwarding node transmit neighbor information notification.

FIG. 12 is a flowchart showing an operation in which the boundary forwarding node 300 and the internal forwarding node 400 transmit a neighbor information notification.

Referring to FIG. 12, first, the local ID determination unit 340 (430) determines the local ID (step S400). In a case of using a link ID as the local ID, the link ID is determined by implementing negotiation between neighboring nodes and the link ID. It is to be noted that in a case of using an identifier of the communication interface as the local ID, an identifier assigned to the communication interface 310 (410), which is provided in the boundary forwarding node 300 in question or the internal forwarding node 400, is the local ID.

Here, the link ID is determined with regard to all physical or logical links that can be used by the boundary forwarding node 300 or the internal forwarding node 400. In the same way, the identifier of the communication interface is determined with regard to all physical or logical communication interfaces. However, for management or other reasons, some links and communication interfaces may be excluded.

Next, the local ID determination unit 340 (430) associates the determined local ID and the communication interface information (information necessary for deciding the communication interface in question as the destination), to be recorded in the forwarding table (refer to FIG. 3) in the recording unit 370 (450) (step S401). Identifiers of neighboring nodes connected ahead of each link are associated and recorded in the forwarding table. Furthermore, information related to each link, and malfunction information of neighbor links and the like, may be recorded as accompanying information.

When the recording to the forwarding table is complete, the neighbor information notification unit 350 (440) configures the local ID and neighbor information setting neighboring node identifiers (refer to FIG. 7), from information of the forwarding table recorded in the recording unit 370 (450), and transmits this to the path management server 500 (step S402). Furthermore, information related to each link, and malfunction information of neighboring nodes and the like, may be stored as accompanying information in the neighbor information.

Next, operation of the path management server 500 is described.

Figure 13:
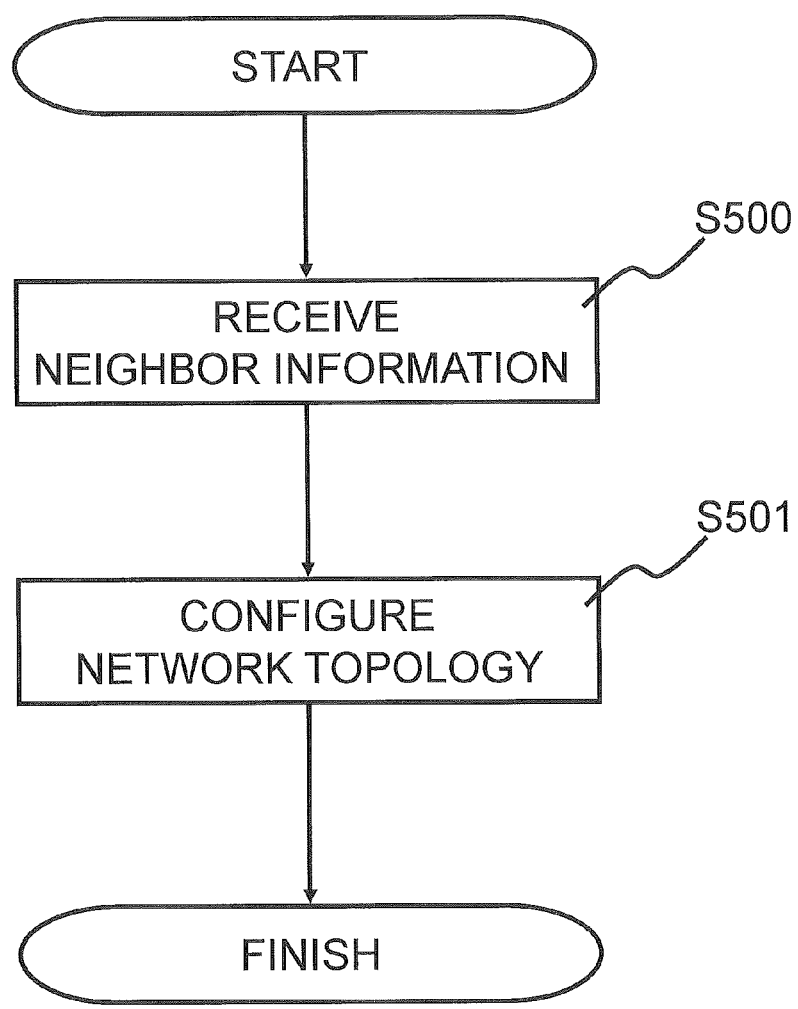
FIG. 13 is a flowchart showing operation when a path management server receives neighbor information notification.

FIG. 13 is a flowchart representing processing of the path management server 500 that receives the abovementioned neighbor information. Referring to FIG. 13, first, when neighbor information sent from the boundary forwarding node 300 or the internal forwarding node 400 is received at the path information collection unit 520 (step S500), the path management server 500 acquires a local ID and identifier of a neighboring node from the received neighbor information, and uses the acquired information to configure the network topology information to be recorded in the recording unit 540 (step S501).

Figure 14:
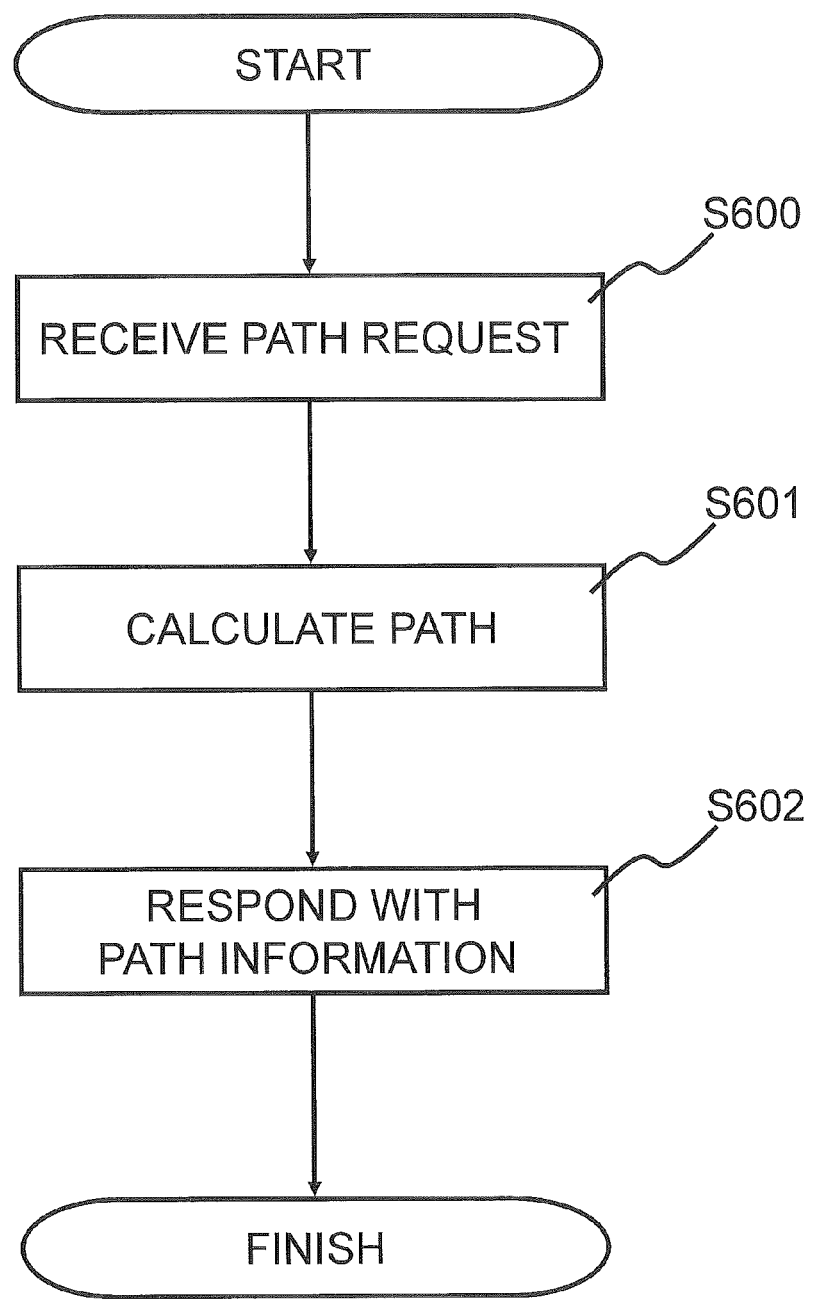
FIG. 14 is a flowchart showing an operation when a path management server requests path information.

FIG. 14 is a flowchart representing processing of the path management server 500 from which path information is requested from the boundary forwarding node 300. Referring to FIG. 14, first when a path request signal is received from the boundary forwarding node 300, the path request processing unit 530 provides notification of information included in the path request signal to the path calculation unit 531 (step S600).

Next, the path calculation unit 531 performs calculation of the optimal forwarding path, according to information included in the path request signal notified in step S600, and the network topology information recorded in the path information recording unit 540 (step S601). When the calculation of the forwarding path is complete, the path calculation unit 531 reads a local ID for each 1 hop in forwarding order of the determined path, and provides notification to the path request processing unit 530.

The path request processing unit 530 that has received a result of the calculation of the forwarding path sets the forwarding path information that has been notified (arrangement of local IDs) in a path information response signal, to be transmitted to the boundary forwarding node 300 that is the source of the path request signal (step S602).

Figure 15:
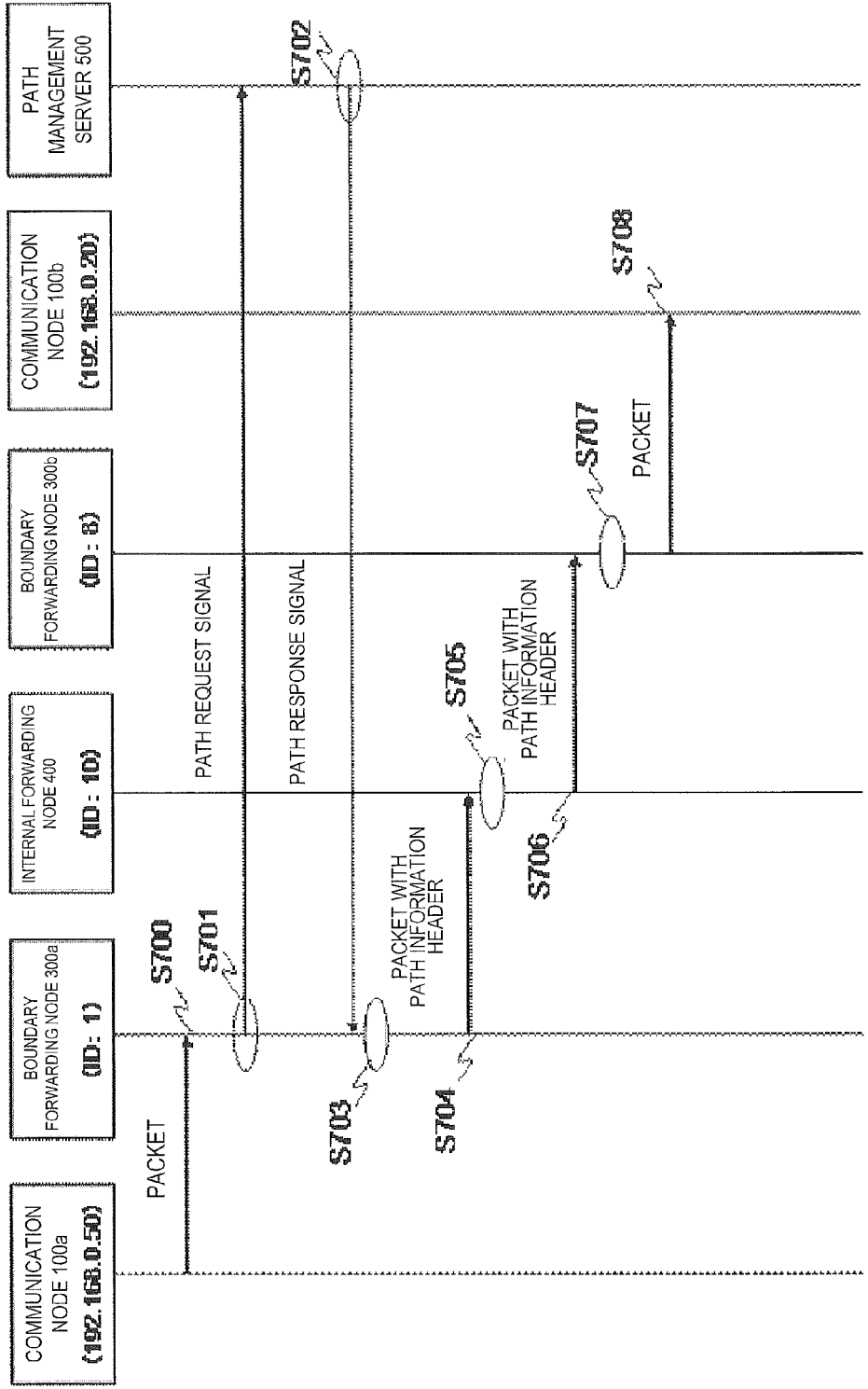
FIG. 15 is a sequence diagram showing a flow of a packet forwarding when a communication node transmits a packet to an opposing communication node.

Finally, referring to a sequence diagram of FIG. 15, a description is given of a flow sequence in which the communication node 100a, which is an IP node, transmits a packet to the boundary forwarding node 300a, sequential forwarding processing thereof is performed, and finally delivery is made to a communication node 100b, which is an IP node.

Here, as an example a description is given in which a connection state of the respective nodes is as in a network topology that is shown in FIG. 8. The boundary forwarding node 300a is equivalent to a node with ID=1 in FIG. 8. The boundary forwarding node 300b is equivalent to a node with ID=8 in FIG. 8. The source address of an IP packet is 192.168.0.50, and a destination address is 192.168.0.20.

When the IP packet transmitted from the communication node 100a reaches the boundary forwarding node 300a (step S700), the boundary forwarding node 300a performs processing in accordance with a flowchart shown in FIG. 9. Here, since a path information header is not assigned to the IP packet, the path information request signal in step S101 of FIG. 9 is transmitted to the path management server 500 (step S701).

The path management server 500 that receives the path information request signal, after calculating the path information and determining the forwarding path, in accordance with a flowchart of FIG. 14, transmits the path information response signal to the boundary forwarding node 300a (step S702).

In a case of calculating the shortest path without considering link band or congestion state, the forwarding path is calculated as follows. With regard to the shortest path in the network topology of FIG. 8, a node of ID=1→a node of ID=10→a node of ID=8→a node of 192.168.0.20 (an IP node of an external network that is a destination of the packet) is selected as a forwarding path. Therefore, values of 1, 2, 0, which are link IDs on a path of the network topology of FIG. 8 are contained in the abovementioned order as local IDs, in the path information response signal.

Here, a link ID (=0) between a node of ID=192.168.0.50 (an IP node of the external network 700) and the node of ID=8, may be included in the path information response. In this case, the storing order of local IDs included in the path information response signal is 0, 1, 2, 0. Conversely, not having the link ID (=0) to the external network (the communication node 100*b*) included in the path information response is also possible. In this case, the storing sequence of the local IDs. is 1, 2.

Furthermore, an IP address was used as the ID of the IP node of the external network, but use is also possible as a network address where an arbitrary bit length is extracted from the upper end of the IP address, and layer 2 information such as a MAC (Media Access Control) address and the like, or other information may be used.

When the boundary forwarding node 300 receives the path information response signal (step S703), in accordance with processing after step S102 in FIG. 9, the path information header is assigned to the IP packet received in step S700, and thereafter, in step S103 of FIG. 9, in accordance with the assigned path information header, the packet is transmitted from the communication interface corresponding to the local ID (=1) to be forwarded (step S704). As a result, the packet is forwarded to the internal forwarding node 400 of ID=10.

On receiving the packet that has been assigned the path information header (step S705), the internal forwarding node 400 performs forwarding processing in accordance with the flowchart shown in FIG. 11 (step S706). Here, in accordance with the forwarding path information, the packet is transmitted from the communication interface corresponding to the local ID (=2) that is to be forwarded, and the packet is forwarded to the boundary forwarding node 300*b* of ID=8.

On receiving the packet that has been assigned the path information header (step S707), the boundary forwarding node 300*b* performs forwarding processing in accordance with the flowchart shown in FIG. 9. Furthermore, in step S103 of FIG. 9, forwarding processing shown in the flowchart shown in FIG. 10 is additionally implemented. Here, since forwarding to the external network is decided in step S201 in FIG. 10, after the path information header is removed from the received packet, the boundary forwarding node 300*b*, in accordance with the information of the path information header before removal, transmits the packet from the communication interface corresponding to the local ID (=0) that is to be forwarded (step S708). As a result, the IP packet is finally forwarded to the communication node 100*b*.

According to the present exemplary embodiment as described above, the configuration is such that a forwarding destination is indicated by using a local ID whose uniqueness is ensured in a local range such as within the forwarding node or among neighboring forwarding nodes, not with path information whose uniqueness is assured globally such as by an IP address or the like. As a result, a forwarding path of 1 hop amount can be contained in an information amount of about 1 byte or 2 bytes, and in a case where information of the forwarding path in question is contained in the path information header and assigned to the packet, it is possible to curtail overhead due to the assigned header to a very small size. As a result, it becomes possible to contain the path information header in all packets without limitation to applications.

Furthermore, in the present exemplary embodiment, it is possible to have a number of entries in a forwarding table provided in a forwarding node approximately a number of communication interfaces which are provided in the respective forwarding nodes. In addition, it is possible to curtail the size of memory necessary for forwarding nodes and CPU processing power, in order to contain, update, and use the forwarding table, and low cost forwarding nodes are possible.

From a result thereof, according to the present exemplary embodiment, even in a case where the forwarding path is strictly specified for each 1 hop, it is possible to forward net information with good efficiency, and furthermore at high speed.

Second Exemplary Embodiment

Next, a detailed description is given concerning a second exemplary embodiment of the present invention in which a modification has been added to the first exemplary embodiment of the present invention, making reference to the drawings.

Since an overall configuration of the second exemplary embodiment of the present invention has a configuration and functionality that are nearly the same as the first exemplary embodiment, a description given below is centered on points of difference thereof.

Figure 16:
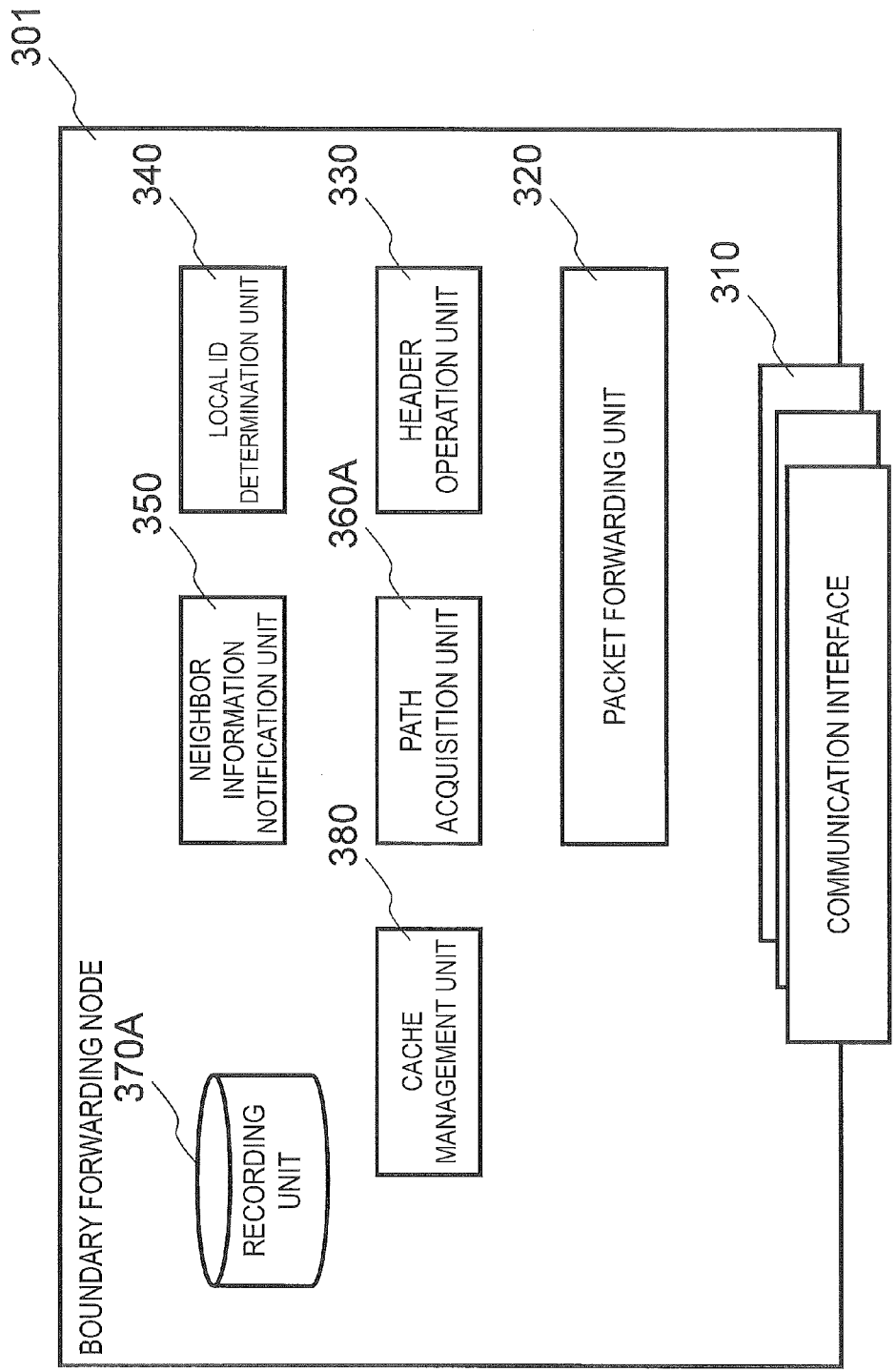
FIG. 16 is a diagram showing a configuration of a boundary forwarding node of the communication system according to a second exemplary embodiment of the present invention.

FIG. 16 is a diagram representing a configuration of a boundary forwarding node 301 of the second exemplary embodiment of the present invention. Referring to FIG. 16, the boundary forwarding node 301 of the present exemplary embodiment has a configuration in which a cache management unit 380 is added to the configuration of a boundary forwarding node 300 of the first exemplary embodiment. Furthermore, operations of a path acquisition unit 360A and information recorded in a recording unit 370A are different from the first exemplary embodiment.

The path acquisition unit 360A is provided with a function that is nearly the same as the path acquisition unit 360 of the first exemplary embodiment of the present invention, but it is further provided with a function that searches a path information cache, to be described later, before making a request for forwarding path information to a path management server 500. As a result of searching the path information cache, in a case where a path information cache corresponding to a received packet is found, the forwarding path information is acquired from the found path information cache, without making a request for the path information to the path management server 500. Furthermore, in a case where the path information cache is not found, a path acquisition unit 360A transmits information of the received packet and forwarding path information acquired from the path management server 500 to the cache management unit 380 for recording as the path information cache.

The cache management unit 380 is provided with a function that associates the information of the received packet and information set in the path information header, and recording in the recording unit 370A as the path information cache, when the path acquisition unit 360A acquires the forwarding path information from the path management server 500, and when a header operation unit 330 removes the path information header.

In the present exemplary embodiment, a destination address and a source address are recorded as the information of the received packet. However, other information may be used in addition to the destination address and the source address.

After a fixed period of time has elapsed, or when there is an accumulation of a fixed amount of the path information cache, the path information cache may be removed from an old path information cache. Furthermore, an arbitrary path information cache may be removed for management reasons or the like.

The recording unit 370A, in addition to information recorded by the recording unit 370 in the first exemplary embodiment, further records the path information cache. Management such as adding, updating, and removing, is performed by the cache management unit 380 with regard to the path information cache.

Next, operation of the boundary forwarding node 301 in the abovementioned second exemplary embodiment is described.

Figure 17:
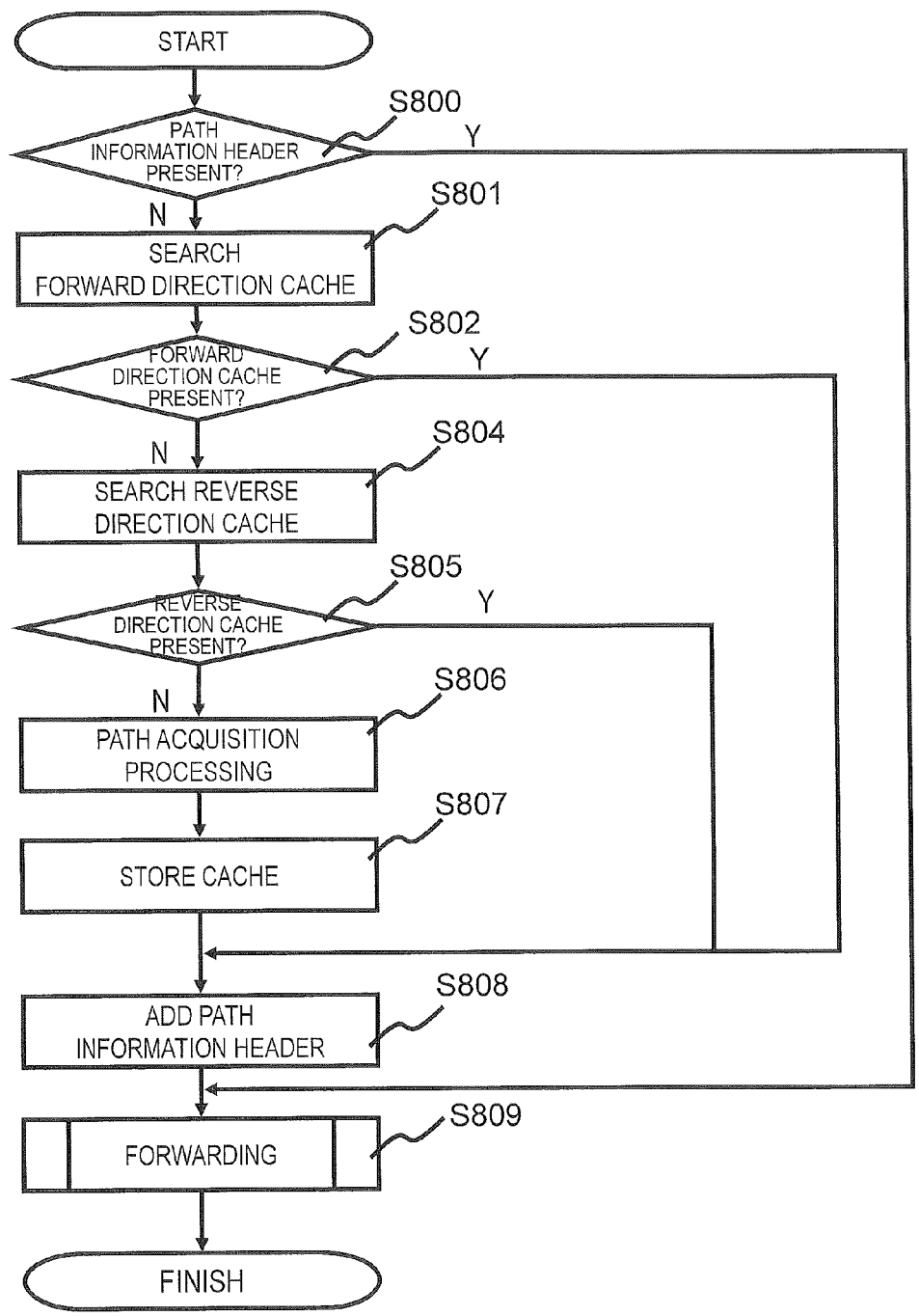
FIG. 17 is a flowchart showing operation when a boundary forwarding node of the second exemplary embodiment of the invention receives a packet.

FIG. 17 shows processing in a case where the boundary forwarding node 301 receives a packet from a data transfer network 600 or an external network 700.

Referring to FIG. 17, first, on receiving a packet via a communication interface 310, the packet forwarding unit 320 checks whether or not a path information header is assigned to the packet in question (step S800).

In a case where the path information header is assigned, control proceeds to 'Y', and forwarding processing is performed in accordance with the path information header (to step S809). On the other hand, in a case where the path information header is not assigned, control proceeds to 'N', and the path acquisition unit 360A performs search processing of the path information cache in a regular (forward) direction (step S801). In the search of the path information cache in the regular (forward) direction, it is possible to perform a comparison of a destination address of the received packet and a destination address in the path information cache.

As a result of the search of the path information cache in the regular (forward) direction, in a case where the path information cache is found ('Y' in step S802), the path information cache in question is used to perform processing to add the path information header (to step S808).

On the other hand, as a result of the search of the path information cache in the regular (forward) direction, in a case where the path information cache is not found ('N' in step S802), the path acquisition unit 360A performs processing to search the path information cache in a reverse direction (step S804). In the search of the path information cache in the reverse direction, it is possible to perform a comparison of the destination address of the received packet and a source address in the path information cache.

As a result of the search of the path information cache in the reverse direction, in a case where the path information cache is found ('Y' in step S805), the path information cache in question is used to perform processing adding the path information header (to step S808).

On the other hand, as a result of the search of the path information cache in the reverse direction, in a case where the path information cache is not found ('N' in step S805), the path acquisition unit 360A transmits a path request signal to the path management server 500 and performs path acquisition processing for acquiring the forwarding path information (step S806).

When the acquisition of the forwarding path information is complete, the cache management unit 380 associates the destination address and the source address included in the received packet, and the forwarding path information acquired in step S806 and performs recording in the recording unit 370A as the path information cache (step S807).

Furthermore, the header operation unit 330 forms the path information header, in accordance with the order of the forwarding path of the acquired forwarding path information or the path information cache, to be added to the head of the received packet (step S808). Values set in respective fields of the path information header are as follows.

In a case where the forwarding path information is acquired from the path management server 500, the path information is set in accordance with the forwarding order, to a local ID field ('Local ID #n') of the path information header shown in FIG. 4. Furthermore, 'Direction' is set to '1' and 'Current Offset' is set to '0'.

Furthermore, in a case where path information is acquired from the path information cache in a regular (forward) direction cache search in step S801, 'Direction' is set to '1' and 'Current Offset' is set to '0'. A value recorded in the path information cache is set in 'Local ID #n', while maintaining the order as it is.

On the other hand, in a case where path information is acquired from the path information cache in a reverse direction cache search in step S804, 'Direction' is set to '2' and 'Current Offset' is set to a value recorded in the path information cache. A value recorded in the path information cache is set in 'Local ID #n', while maintaining the order as it is.

It is to be noted that in a case of acquiring path information from the path information cache in the reverse direction cache search in step S804, a value recorded in the path information cache can be set in 'Local ID #n' in reverse order. In this case, 'Direction' is set to '1', and 'Current Offset' is set to the number of offset bytes indicating a local ID #n that is a first forwarding destination.

The packet forwarding unit 320 implements forwarding processing in accordance with the path information header configured as above (step S809). Details of the processing of step S809 are nearly the same as the forwarding processing of the boundary forwarding node 300 in the first exemplary embodiment shown in FIG. 10, and thus are omitted. However, in the present exemplary embodiment, in step S205 of FIG. 10, when the path information header is removed, the cache management unit 380 associates information of a received packet and information set in the path information header, and performs recording in the recording unit 370A as the path information cache.

Next, a description is given of flow of processing of a packet forwarding between a communication node 100a and a communication node 100b in the second exemplary embodiment.

A first (outward) packet forwarding procedure is nearly the same as in the first exemplary embodiment, and a packet is forwarded as in a sequence diagram shown in FIG. 15. However, in step S703 and step S707 in FIG. 15, a path information cache shown in FIGS. 18A and 18B is created in a recording unit 370 of each of a boundary forwarding node 301a and a boundary forwarding node 301b.

Values set in fields of the same name in the path information header are recorded in 'Direction', 'Current Offset', 'Route Length' recorded in the path information fields in the path information cache of FIGS. 18A and 18B. The value of a 'Local ID #n' field of the path information header is recorded in 'Local IDs', while maintaining the order as it is.

In a case of acquiring the path information from the path management server 500, '0' is recorded in 'Direction', and '0' is recorded in 'Current Offset'. In addition, total byte length of the local IDs for the number of acquired forwarding paths, and the local IDs for the number of forwarding paths are respectively set in 'Route Length' and 'Local IDs'. It is to be noted that values in parentheses indicate values recorded in a case of processing packet forwarding in accordance with the sequence diagram of FIG. 15.

Creation time information is also included in the path information cache of FIGS. 18A and 18B, but this is not necessarily required. It is to be noted that the creation time information of HH:MM:SS indicates hours, minutes, and seconds, respectively.

Figure 19:
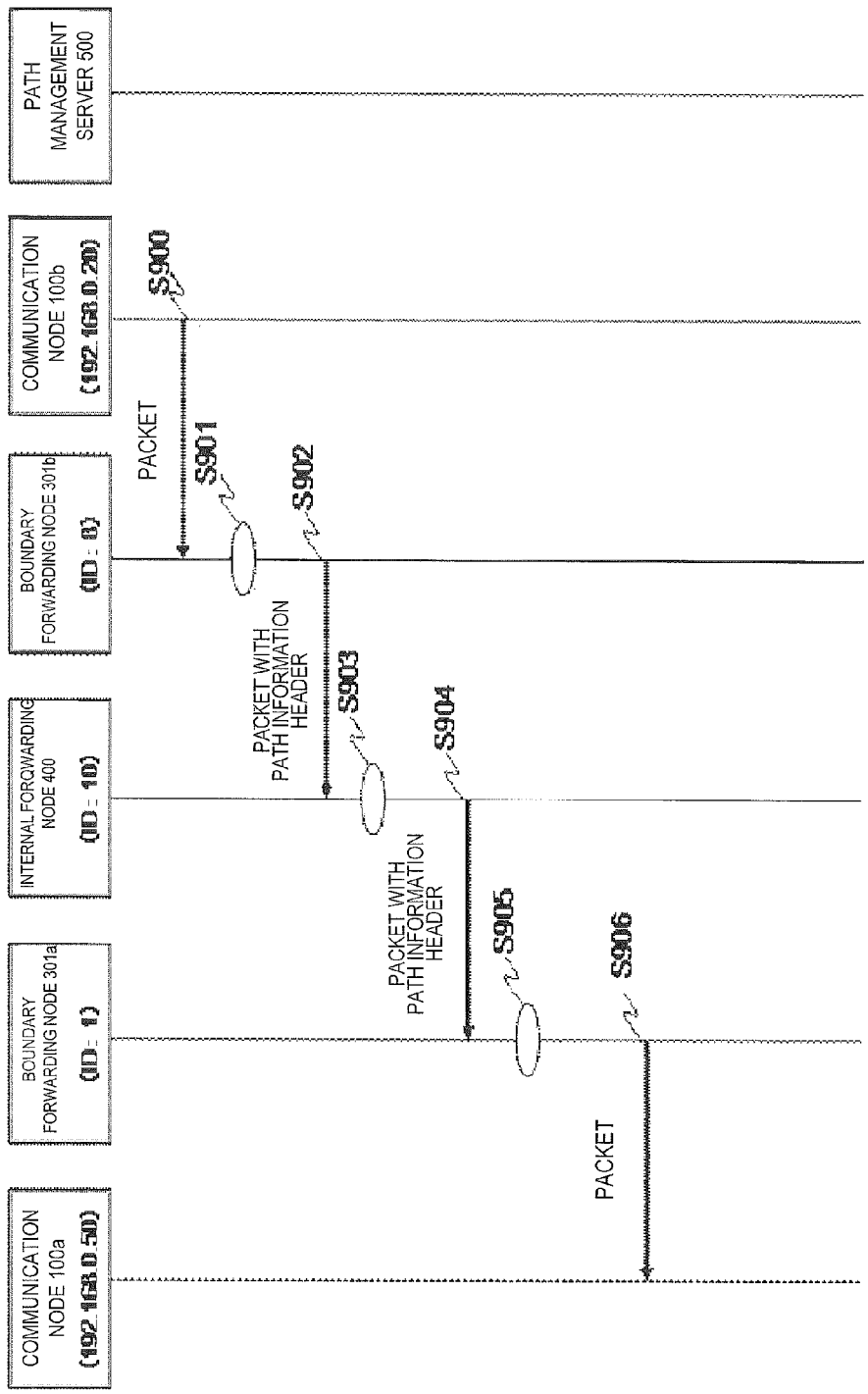
FIG. 19 is a sequence diagram showing a flow of a packet forwarding when packet transmission is performed to a source of a packet received by a communication node, in the communication system of the second exemplary embodiment of the present invention.
Figure 20:
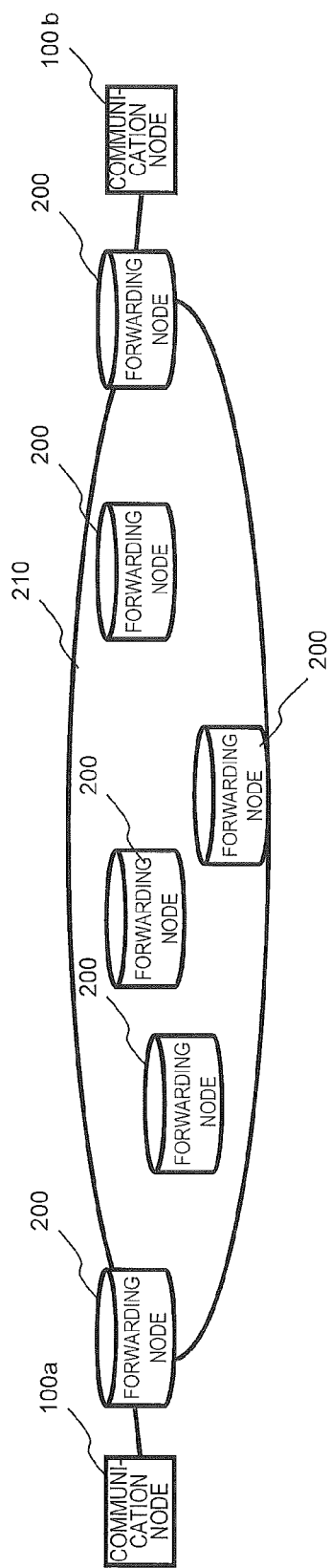
FIG. 20 is a diagram showing a communication system performing packet forwarding, as a description of background technology.

Next, making reference to a sequence diagram of FIG. 19, a description is given of a flow sequence in which, after a packet transmitted by the communication node 100a is forwarded to a destination of the communication node 100b, now the communication node 100b transmits a packet to the communication node 100a, forwarding processing thereof is performed in order, and finally delivery is made to the communication node 100a, which is an IP node.

In what follows, a description is given in which a connection state of each nodes is as in a network topology that is shown in FIG. 8. The boundary forwarding node 301a is equivalent to a node with ID=1 in FIG. 8. The boundary forwarding node 301b is equivalent to a node with ID=8 in FIG. 8. A source address of an IP packet is 192.168.0.20, and a destination address is 192.168.0.50.

When the IP packet is transmitted from the communication node 100b (step S900) and reaches the boundary forwarding node 300b, the boundary forwarding node 301b performs processing in accordance with a flowchart shown in FIG. 17 (step S901). First, since a path information header is not assigned to the IP packet, a path information cache search in a regular direction is performed in step S801 of FIG. 17. That is, processing is performed to scan destination address fields of the path information cache shown in FIG. 18B, and to search for an entry having the destination address of 192.168.0.50.

In the path information cache shown in FIG. 18B, since there is no entry having the destination address of 192.168.0.50 in the destination address field, now, a path information cache search in a reverse direction is performed in step S804 of FIG. 17. That is, processing is performed to scan source address fields of the path information cache shown in FIG. 18B, and to search for an entry having the destination address of 192.168.0.50.

In an example of the path information cache shown in FIG. 18B, there is an entry having the destination address of 192.168.0.50 in a source address field. The path acquisition unit 360A reads path information of the entry found by the search.

The path information read from the path information cache shown in FIG. 18B is as follows.
'Direction'=1
'Current Offset'=2
'Route Length'=3
'Local IDs'={1, 2, 0}

Here, when configuring the path information header from the read path information, the order of the forwarding path 'Local IDs' is maintained. In this case, respective fields of the path information headers are set as follows.
'Direction'=2
'Current Offset'=2
'Header Length'=4
'Route Length'=3
'Local ID #0'=1
'Local ID #1'=2
'Local ID #2'=0

In this way, since 'Direction' is '2', forwarding in a reverse direction is performed.

Furthermore, in the forwarding processing in a regular (forward) direction as shown in the sequence diagram of FIG. 15, a configuration can be considered that does not include information corresponding to forwarding to an external network, in information of a local ID contained in the path information header. In this case, the information in question is not included in the path information cache, and as a result, respective fields of the configured path information header are as follows.
'Direction'=2
'Current Offset'=2
'Header Length'=4
'Route Length'=3
'Local ID #0'=1
'Local ID #1'=2

After the path information header has been configured, the path information header is assigned to the received packet, and forwarding processing is performed (step S902). As a result, the packet is transmitted from a communication interface corresponding to a local ID (=2), and the packet is forwarded to an internal forwarding node 400 of ID=10.

On receiving the packet assigned to the path information header, the internal forwarding node 400 follows a flowchart shown in FIG. 11, and executes forwarding processing with a packet having the path information header assigned and forwarding in a reverse direction (step S903). Here, in accordance with the forwarding path information, the packet is transmitted from a communication interface corresponding to the local ID (=2) that is to be forwarded, and the packet is forwarded to the boundary forwarding node 301a of ID=1 (step S904).

On receiving the packet to which the path information header is assigned, the boundary forwarding node 301a follows the flowchart shown in FIG. 17, and executes forwarding processing with a packet having the path information header assigned and forwarding in a reverse direction (step S905).

Furthermore, since 'Current Offset' of the path information header is '0', a decision is made to forward to the external network in step S203 of FIG. 10, and the path information header is removed in step S205. At this time, since an entry shown in FIG. 18A is already recorded in the path information cache of the boundary forwarding node 301A, the recording time of the entry is updated, without newly adding a path information cache in which content is duplicated. Thereafter, forwarding processing is implemented using information (destination address 192.168.0.50) of the packet after removal of the path information header. As a result, the packet is forwarded to the communication node 100a that is a destination (step S906).

According to the second exemplary embodiment of the present invention as described above, on acquiring the path information from the path management server 500, or on removing the path information header, the boundary forwarding nodes 301a and 301b record path information acquired from the path management server 500 and path information included in the path information header, to be used as the path information cache. Therefore, the frequency of transmitting path requests to the path management server 500 is reduced, and it is possible to reduce the load on the path management server 500.

Furthermore, according to the second exemplary embodiment of the present invention, since a cache of path information, which is recorded when a packet is transmitted to a destination, is used when forming a path information header for a packet transmitted to a source of a reverse direction packet, that is, the abovementioned packet, it is possible to improve an effect of reducing the load on the path management server 500.

A description has been given above of preferred exemplary embodiments of the present invention, but the present invention is not limited to the abovementioned exemplary embodiments, and further modifications, substitutions, and adjustments can be added within a scope that does not depart from a fundamental technological concept of the present invention. For example, in each of the abovementioned exemplary embodiments, a description has been given using link IDs shared among neighboring nodes of both link ends, but it is also possible to use identifiers of the communication interfaces as the local IDs. In this case, where forwarding in both directions is implemented, identifiers of communication interfaces may be interchanged among neighboring nodes, and information may be shared. Clearly, one-directional forwarding can also be implemented, without performing interchanging of identifiers of the communication interfaces among the neighboring nodes.

In addition, instead of a link ID or a communication interface identifier, it is possible to use a modified configuration in which a third local ID is used as a data index, and this is attached to the link ID and the communication interface.

Furthermore, for example, in the abovementioned exemplary embodiments, a description has been given in which each of the forwarding nodes is provided with a local ID determination unit, and each local ID is determined, but it is possible to use a configuration in which, in a case where it is possible to obtain configuration information of each forwarding node in the path management server, the path management server determines the local ID and records a forwarding table in a recording unit of each thereof. In this case, it is possible to omit the local ID determination unit of each of the forwarding nodes. Moreover, the path management server can obtain connection relationships of each of the forwarding nodes, and in a case where it is possible to set local IDs such that neighboring nodes are not duplicated, it is possible to omit the neighbor information notification unit of each of the forwarding nodes.

Furthermore, the path management server 500 of the abovementioned exemplary embodiments can be realized by an open flow controller of Non-Patent Document 1, and in this case, the forwarding nodes can be realized by an open flow switch.

The path management server 500 of the abovementioned exemplary embodiments can be realized as a dedicated server, and it is possible to realize, outside of the abovementioned open flow switch, a router in an IP network, or an MPLS switch in an MPLS network, as the forwarding nodes. Otherwise, as long as a network is such that a server can perform central control of forwarding nodes in the network, application of the present invention is possible.

INDUSTRIAL APPLICABILITY

In a commercial network such as a data center, it is necessary to strictly control packet forwarding paths according to various conditions such as destination address, source address, and protocol used, for purposes of QoS (Quality of Service) or load sharing. According to the present invention, it is possible to strictly specify a forwarding path while curtailing packet overhead, without increasing path information. Therefore, the present invention can be preferably applied to commercial networks such as a data center.

In the following, preferred modes are summarized.
Mode 1
A communication system comprising: a path management server for configuring forwarding path information by arranging identifiers for identifying communication interfaces provided in respective forwarding nodes in a forwarding path of a data transfer network or links extending between the respective forwarding nodes and neighboring nodes thereof, and a forwarding node for performing packet forwarding processing in accordance with the forwarding path information, with regard to a packet to which is added a header containing the forwarding path information.
Mode 2
The communication system according to mode 1, wherein the identifiers are unique inside at least one forwarding node.
Mode 3
The communication system according to mode 1, wherein the identifiers are unique among at least one forwarding node and a forwarding node that neighbors the forwarding node.
Mode 4
The communication system according to any one of modes 1 to 3, wherein the header further includes information indicating forwarding direction.
Mode 5
The communication system according to any one of modes 1 to 4, wherein, among the forwarding nodes, a forwarding node (boundary forwarding node) positioned at a boundary with an external network comprises a header operation unit for performing addition of a header containing the forwarding path information to a packet received from the external network, or for performing removal of a header containing the forwarding path information from a packet transmitted to the external network.
Mode 6
The communication system according to mode 5, wherein the boundary forwarding node further comprises a cache management unit for holding information included in the header, and a header formed using the held information is assigned to a packet having an identical destination.
Mode 7
The communication system according to mode 5, wherein the boundary forwarding node further comprises a cache management unit for holding information included in the header, when the header is removed, and a header formed using the held information is assigned to a packet in a reverse direction transmitted to a source of the packet from which the header was removed.
Mode 8
The communication system according to any one of modes 5 to 7, wherein the header can include information so that the boundary forwarding node distinguishes between a case of forwarding to an external network, and another case.
Mode 9
The communication system according to any one of modes 5 to 8, further comprising a path management server for holding connection information of the respective forwarding nodes, and for creating and providing forwarding path information, in response to a request from the boundary forwarding node.
Mode 10
The communication system according to mode 9, wherein each of the forwarding nodes comprises a neighbor information notification unit for providing notification, to the path management server, of an identifier in order to distinguish a communication interface of the forwarding node or a link extending between the forwarding node itself and neighboring node, and the path management server creates forwarding path information to be provided to the boundary forwarding nodes, based on information notified from each of the forwarding nodes.

Mode 11

The communication system according to mode 4, wherein each of the forwarding nodes performs information exchange with neighboring forwarding nodes, acquires correspondence relationships of communication interfaces between itself and neighboring nodes, and performs packet forwarding processing based on a forwarding direction included in the header.

Mode 12

A forwarding node connected to a path management server for configuring forwarding path information by arranging identifiers for identifying communication interfaces provided in respective forwarding nodes in a forwarding path of a data transfer network or links extending between the respective forwarding nodes and neighboring nodes thereof, the forwarding node performing packet forwarding processing in accordance with the forwarding path information, with regard to a packet to which is added a header containing the forwarding path information.

Mode 13

The forwarding node according to mode 12, wherein the identifiers are unique inside at least one forwarding node.

Mode 14

The forwarding node according to mode 12, wherein the identifiers are unique among at least one forwarding node and a forwarding node that neighbors the forwarding node.

Mode 15

The forwarding node according to any one of modes 12 to 14, comprising a neighbor information notification unit for providing notification, to the path management server for managing the forwarding path information, of an identifier in order to distinguish a communication interface of the forwarding node or link extending between the forwarding node itself and neighboring node thereof.

Mode 16

A boundary forwarding node disposed at a boundary of a data transfer network and an external network, the node comprising a header operation unit, that: performs packet forwarding processing in accordance with forwarding path information, with regard to a packet to which is added a header containing forwarding path information configured by arranging identifiers for identifying communication interfaces provided in respective forwarding nodes in a forwarding path of a data transfer network or links extending between the respective forwarding nodes and neighboring nodes thereof, and performs addition of a header containing the forwarding path information to a packet received from the external network or removal of a header containing the forwarding path information from a packet transmitted to the external network.

Mode 17

The boundary forwarding node according to mode 16, further comprising a cache management unit for holding information included in the header, wherein a header formed using the held information is assigned to a packet having an identical destination.

Mode 18

The boundary forwarding node according to mode 16, further comprising a cache management unit for holding information included in the header when the header is removed, wherein a header formed using the held information is assigned to a packet in a reverse direction transmitted to a source of the packet from which the header was removed.

Mode 19

A path management server comprising: a path calculation unit for creating forwarding path information configured by arranging identifiers for identifying communication interfaces provided in respective forwarding nodes in a forwarding path of a data transfer network or links extending between the respective forwarding nodes and neighboring nodes thereof; and a path request processing unit for transmitting the created forwarding path information, in response to a request from a boundary forwarding node disposed at a boundary of the data transfer network and an external network.

Mode 20

The path management server according to mode 19, wherein the path management server creates forwarding path information in which are arranged identifiers that are unique inside at least one forwarding node.

Mode 21

The path management server according to mode 19 or 20, wherein the path management server creates forwarding path information that arranges identifiers that are unique among at least one forwarding node and a forwarding node that neighbors the forwarding node.

Mode 22

The path management server according to any one of modes 19 to 21, wherein the path management server, in addition to the forwarding path information, transmits information indicating forwarding direction to the boundary forwarding node, and creates a header including information indicating a forwarding direction in the boundary forwarding node.

Mode 23

The path management server according to any one of modes 19 to 22, wherein the path management server, in addition to the forwarding path information, transmits information to the boundary forwarding node, so that the boundary forwarding node distinguishes between a case of forwarding to an external network and another case, and creates a header including information as to whether or not forwarding is to the external network.

Mode 24

The path management server according to any one of modes 19 to 23, comprising a path information collection unit for configuring network topology information in a data transfer network, based on information notified from the respective forwarding nodes, wherein the path calculation unit performs a path calculation based on the network topology information.

Mode 25

A communication method comprising: respective forwarding nodes in a forwarding path of a data transfer network receive a packet to which is added a header containing forwarding path information configured by arranging identifiers for identifying communication interfaces provided in respective forwarding nodes in a forwarding path of a data transfer network or links extending between the respective forwarding nodes and neighboring nodes thereof, and performing packet forwarding processing in accordance with the forwarding path information with regard to the packet.

Mode 26

A program for executing on a computer configuring forwarding nodes disposed in a data transfer network, the program comprising: a process of receiving a packet to which is added a header containing forwarding path information configured by arranging identifiers for identifying communication interfaces provided in respective forwarding nodes in a forwarding path of a data transfer network or links extending between the respective forwarding nodes and neighboring nodes thereof, and a process, with regard to the packet, of forwarding a packet in accordance with the forwarding path information of the packet.

Mode 27

A program for executing on a computer configuring a boundary forwarding node disposed at a boundary of a data transfer network and an external network, the program comprising: a process of receiving a packet to which is added a header containing forwarding path information configured by arranging identifiers for identifying communication interfaces provided in respective forwarding nodes in a forwarding path of a data transfer network or links extending between the respective forwarding nodes and neighboring nodes thereof, a process, with regard to the packet, of forwarding a packet in accordance with the forwarding path information of the packet, and a process of performing a header operation of adding a header containing the forwarding path information to a packet received from the external network or removing a header containing the forwarding path information from a packet transmitted to the external network.

Mode 28

A program for executing on a computer configuring, a path management server for holding connection information of rep forwarding nodes disposed in a data transfer network, the program comprising: a process of creating forwarding path information configured by arranging identifiers for identifying communication interfaces provided in respective forwarding nodes in a forwarding path of a data transfer network or links extending between the respective forwarding nodes and neighboring nodes thereof, in response to a request from a boundary forwarding node disposed at a boundary of a data transfer network and an external network, and a process of transmitting the created forwarding path information to the boundary forwarding node. It is to be noted that each disclosure of the abovementioned patent document and non-patent document are incorporated herein by reference. Modifications and adjustments of embodiments and examples are possible within the bounds of the entire disclosure (including the scope of the claims) of the present invention, and also based on fundamental technological concepts thereof. Furthermore, a wide variety of combinations and selections of various disclosed elements is possible within the scope of the claims of the present invention. That is, the present invention clearly includes every type of transformation and modification that a person skilled in the art can realize according to the entire disclosure including the scope of the claims and to technological concepts thereof.

EXPLANATIONS OF SYMBOLS 100, 100a, 100b communication node
200 forwarding node
300, 300a, 300b, 301, 301a, 301b boundary forwarding node
310 communication interface
320 packet forwarding unit
330 header operation unit
340 local ID determination unit
350 neighbor information notification unit
360 path acquisition unit
370 recording unit
360A path acquisition unit
370A recording unit
380 cache management unit
400 internal forwarding node
410 communication interface
420 packet forwarding unit
430 local ID determination unit
440 neighbor information notification unit
450 recording unit
500 path management server
510 communication interface
520 path information collection unit
530 path request processing unit
531 path calculation unit
540 path information recording unit
600 data transfer network
700 external network

What is claimed is:

1. A packet forwarding node, comprising:
a storage unit including a non-transitory computer readable medium configured to store a packet forwarding table used for forwarding a packet based on an identifier which identifies a link between nodes on a packet forwarding path; and
at least one processor configured to execute program instructions to provide a forwarding unit configured to:
receive an incoming packet including a plurality of the identifiers;
determine a direction to forward the incoming packet;
determine whether to forward to an external network;
add to path or link information when the incoming packet is not forwarded to the external network;
remove path or link information header when the incoming packet is forwarded to the external network; and
forward the incoming packet by using a path or link that corresponds to the identifier from among the plurality of the identifiers.

2. The packet forwarding node according to claim 1, wherein the storage unit stores the table used for forwarding the packet based on the identifier which uniquely identifies the link within a predetermined domain.

3. The packet forwarding node according to claim 1, wherein the storage unit stores the table used for forwarding the packet based on the identifier which uniquely identifies the link within a predetermined local domain.

4. The packet forwarding node according to claim I, wherein the storage unit stores the table used for forwarding the packet based on the identifier which uniquely identifies the link within the packet forwarding node.

5. The packet forwarding node according to claim 1, wherein the storage unit stores the table used for forwarding the packet based on the identifier which unique identifies the link among the packet forwarding nodes.

6. A packet forwarding node, comprising:
a storage unit including a non-transitory computer readable medium configured to store a packet forwarding table used for forwarding a packet based on an identifier which identifies an interface of a packet forwarding node; and
at least one processor configured to execute program instructions to provide a forwarding unit configured to receive an incoming packet including a plurality of identifiers, determine a direction to forward the incoming packet, determine whether to forward to an external network, add to path or link information when the incoming packet is not forwarded to the external network, remove path or link information header when the incoming packet is forwarded to the external network, and to forward the incoming packet by using a path or link that corresponds to the identifier from among the plurality of identifiers.

7. The packet forwarding node according to claim 6, wherein the storage unit stores the table used for forwarding the packet based on the identifier which uniquely identifies the link within a predetermined domain.

8. The packet forwarding node according to claim 6, wherein the storage unit stores the table used for forwarding the packet based on the identifier which uniquely identifies the link within a predetermined local domain.

9. The packet forwarding node according to claim 6, wherein the storage unit stores the table used for forwarding the packet based on the identifier which uniquely identifies the link within the packet forwarding node.

10. The packet forwarding node according to claim 6, wherein the storage unit stores the table used for forwarding the packet based on the identifier which uniquely identifies the link among the packet forwarding nodes.

11. A packet forwarding node, comprising:
a memory storing a program;
at least one processor configured to execute the program to provide:
  a communication unit configured to communicate with a server for receiving a plurality of identifiers, each of which identifies a link between nodes on a packet forwarding path; and
  a forwarding unit configured to:
    receive an incoming packet including the plurality of the identifiers,
    determine a direction to forward the incoming packet,
    determine whether to forward to an external network,
    add to path or link information when the incoming packet is not forwarded to the external network,
    remove path or link information header when the incoming packet is forwarded to the external network, and
    forward the incoming packet by using a path or link that corresponds to an identifier from among the plurality of identifiers.

12. The packet forwarding node according to claim 11, wherein the forwarding unit forwards the packet based on the identifier which uniquely identifies the link within a predetermined domain.

13. The packet forwarding node according to claim 11, wherein the forwarding unit forwards the packet based on the identifier which uniquely identifies the link within a predetermined local domain.

14. The packet forwarding node according to claim 11, wherein the forwarding unit forwards the packet based on the identifier which uniquely identities the link within the packet forwarding node.

15. The packet forwarding node according to claim 11, wherein the forwarding unit forwards the packet based on the identifier which uniquely identifies the link among the packet forwarding nodes.

16. A packet forwarding node, comprising:
a communication unit configured to communicate with a server for receiving a plurality of identifiers, each of which identifies an interface of the packet forwarding node; and
at least one processor configured to execute program instructions to provide a forwarding unit configured to receive an incoming packet including a plurality of identifiers, determine a direction to forward the incoming packet, determine whether to forward to an external network, add to path or link information when the incoming packet is not forwarded to the external network, remove path or link information header when the incoming packet is forwarded to the external network, and forward the incoming packet by using a path or link that corresponds to an identifier from among the plurality of identifiers.

17. The packet forwarding node according to claim 16, wherein the forwarding unit forwards the packet based on the identifier which uniquely identifies the link within a predetermined domain.

18. The packet forwarding node according to claim 16, wherein the forwarding unit forwards the packet based on the identifier which uniquely identifies the link within a predetermined local domain.

19. The packet forwarding node according to claim 16, wherein the forwarding unit forwards the packet based on the identifier which uniquely identifies the link within the packet forwarding node.

20. The packet forwarding node according to claim 16, wherein the forwarding unit forwards the packet based on the identifier which uniquely identifies the link among the packet forwarding nodes.

21. A server, comprising:
a memory storing a computer program;
at least one processor configured to execute the computer program to provide:
  a first unit configured to determine a plurality of identifiers, each of which identifies a link between nodes on a packet forwarding path; and
  a second unit configured send information elements to a packet forwarding node which is capable of receiving an incoming packet including a plurality of identifiers, determining a direction to forward. the incoming packet, determining whether to forward to an external network, adding to path or link information when the incoming packet is not forwarded to the external network, removing path or link information header when the incoming packet is forwarded to the external network, and forwarding the incoming packet by using a path or link, that corresponds to an identifier from among the plurality of identifiers.

22. The packet forwarding node according to claim 1, wherein the storage unit stores the table used for forwarding the packet based on the identifier which identifies the link between adjacent nodes on a packet forwarding path.

23. The packet forwarding node according to claim 6, wherein the storage unit stores the packet forwarding table used for forwarding the packet based on the identifier which identifies the link between adjacent nodes on a packet forwarding path.

24. The packet forwarding node according to claim 11, further comprising a storage unit that stores a table used for forwarding the packet based on an identifier which identifies the link between adjacent nodes on a packet forwarding path.

25. The packet forwarding node according to claim 16, further comprising a storage unit that stores a table used for forwarding the packet based on an identifier which identifies the link between adjacent nodes on a packet forwarding path.

26. The server according to claim 21, further comprising a storage unit to store a packet forwarding table used for forwarding the incoming packet based on the identifier which identifies the link between nodes on the packet forwarding path, wherein the storage unit stores the table used for forwarding the packet based on the identifier which identities a link between adjacent nodes on a packet forwarding path.

27. The packet forwarding node according to claim 1, wherein when the forwarding unit receives the incoming packet including the identifier for the link connecting nodes on the packet forwarding path, the forwarding unit forwards the incoming packet based on the identifier included the received incoming packet from among the plurality of the identifiers.

* * * * *